(12) United States Patent
Wang et al.

(10) Patent No.: US 10,511,415 B2
(45) Date of Patent: Dec. 17, 2019

(54) UPLINK ACK RESOURCE ALLOCATION IN NEW RADIO

(71) Applicant: QUALCOMM Incorporated, San Diego, CA (US)

(72) Inventors: Renqiu Wang, San Diego, CA (US); Wanshi Chen, San Diego, CA (US); Hao Xu, Beijing (CN); Peter Gaal, San Diego, CA (US); Tao Luo, San Diego, CA (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/917,514

(22) Filed: Mar. 9, 2018

(65) Prior Publication Data

US 2018/0262304 A1    Sep. 13, 2018

Related U.S. Application Data

(60) Provisional application No. 62/470,784, filed on Mar. 13, 2017.

(51) Int. Cl.
*H04L 1/18* (2006.01)
*H04L 5/00* (2006.01)
(Continued)

(52) U.S. Cl.
CPC ......... *H04L 1/1861* (2013.01); *H04B 7/0632* (2013.01); *H04L 1/12* (2013.01);
(Continued)

(58) Field of Classification Search
CPC .............. H04W 72/04; H04W 72/042; H04W 72/0413; H04W 72/02; H04L 1/1861;
(Continued)

(56) References Cited

U.S. PATENT DOCUMENTS

2011/0141928 A1*  6/2011  Shin ..................... H04L 1/0028
                                                                370/252
2012/0034927 A1   2/2012  Papasakellariou et al.
(Continued)

FOREIGN PATENT DOCUMENTS

WO    WO-2017023906 A1    2/2017
WO    WO-2017146762 A1    8/2017

OTHER PUBLICATIONS

Ericsson: "On PUCCH Resource Allocation", 3GPP DRAFT R1-1703296, 3rd Generation Partnership Project (3GPP), Mobile Competence Centre, 650, Route Des Lucioles, F-06921, Sophia-Antipolis Cedex, France, vol. RAN WG1. No. Athens. Greece, Feb. 12, 2017 (Feb. 12, 2017), XP051210426, Retrieved from the Internet: URL:http://www.3gpp.org/ftp/Meetings_3GPP_SYNC/RAN1/Docs/, pp. 3.
(Continued)

*Primary Examiner* — Jung Liu
(74) *Attorney, Agent, or Firm* — Arent Fox LLP

(57) ABSTRACT

A method and apparatus for enabling an UE to selecting acknowledgement/non-acknowledgement (ACK/NACK) resources from a subset of a gNB resource pool. The example method may receive, from an gNB, a radio resource control (RRC) configuration indicating a UE-specific resource set that is a subset of a gNB resource pool. The UE may determine one or more ACK/NACK resources from the UE-specific resource set for an upcoming physical uplink control channel (PUCCH). In some aspects, the UE may determine the one or more ACK/NACK resources based on receiving, from the gNB, a physical downlink control channel (PDCCH) including a corresponding ACK/NACK resource configuration. In other aspects, the RRC may contain multiple resource subsets and the UE may determine the one or more ACK/NACK resources based on determin- (Continued)

ing a size of a payload for a UCI to be transmitted on the PUCCH. The aspects may thus enable dynamic ACK/NACK resource allocation.

42 Claims, 11 Drawing Sheets

(51) Int. Cl.
  *H04W 72/04* (2009.01)
  *H04W 72/12* (2009.01)
  *H04B 7/06* (2006.01)
  *H04W 72/02* (2009.01)
  *H04L 1/12* (2006.01)

(52) U.S. Cl.
  CPC .......... *H04L 1/1864* (2013.01); *H04L 5/0053* (2013.01); *H04L 5/0055* (2013.01); *H04W 72/02* (2013.01); *H04W 72/042* (2013.01); *H04W 72/1278* (2013.01); *H04W 72/1289* (2013.01); *H04L 5/0007* (2013.01); *H04L 5/0094* (2013.01); *H04W 72/1268* (2013.01)

(58) Field of Classification Search
  CPC ..... H04L 1/1896; H04L 5/001; H04L 5/0055; H04L 45/245; H04L 5/0094; H04L 1/1854; H04L 5/0078; H04L 1/0028; H04L 5/0053; H04L 12/26
  See application file for complete search history.

(56) References Cited

U.S. PATENT DOCUMENTS

| | | | | |
|---|---|---|---|---|
| 2013/0286990 A1* | 10/2013 | Park | ...................... | H04L 1/1861 370/329 |
| 2015/0016311 A1* | 1/2015 | Han | ...................... | H04W 24/10 370/280 |
| 2015/0092624 A1 | 4/2015 | Yao et al. | | |
| 2015/0110034 A1* | 4/2015 | Yang | ...................... | H04L 1/1861 370/329 |
| 2015/0327230 A1* | 11/2015 | Takeda | ...................... | H04L 5/001 370/329 |
| 2016/0014770 A1* | 1/2016 | Papasakellariou | ... | H04B 7/0417 370/329 |
| 2016/0036559 A1* | 2/2016 | Aiba | ...................... | H03M 13/136 370/329 |
| 2016/0073396 A1* | 3/2016 | Seo | ...................... | H04L 1/0041 370/329 |
| 2016/0226629 A1* | 8/2016 | Liu | ...................... | H04L 1/1861 |
| 2017/0079019 A1* | 3/2017 | Yang | ...................... | H04L 1/1861 |
| 2017/0135094 A1* | 5/2017 | Seo | ...................... | H04L 1/0041 |
| 2018/0254860 A1 | 9/2018 | Wong et al. | | |
| 2018/0262316 A1 | 9/2018 | Wang et al. | | |

OTHER PUBLICATIONS

Ericsson: "Summary of E-Mail Discussions on Uplink Control Signaling," 3GPP TSG-RAN WG1#87 R1-1613162; Nov. 19, 2016 (Nov. 19, 2016), 24 pages.

Huawei., et al., "Resource indication of UL control channel", 3rd Generation Partnership Project (3GPP), Mobile Competence Centre, 650, Route Des Lucioles, Sophia-Antipolis Cedex, France, F-06921, R1-1701648, vol. RAN WG1, XP051208815, Feb. 13, 2017-Feb. 17, 2017 Feb. 12, 2017 (Feb. 12, 2017), 4 pages, Retrieved from the Internet:URL:http://www.3gpp.org/ftp/Meetings_3GPP SYNC/RAN1/Docs/ [retrieved on Feb. 12, 2017].

International Search Report and Written Opinion—PCT/US2018/022017—ISA/EPO—dated Jun. 19, 2018.

Qualcomm Incorporated: "PUCCH resources for multi-bit ACK and resource indexing", 3GPP DRAFT; R1-106342, 3rd Generation Partnership Project (3GPP), Mobile Competence Centre; 650, Route Des Lucioles; F-06921, Sophia-Antipolis Cedex; France, vol. RAN WG1, No. Jacksonville, USA, Nov. 9, 2010, XP050489725, pp. 1-3.

Qualcomm Incorporated: "Resource Allocation for PUCCH", 3GPP DRAFT; R1-1702634, 3rd Generation Partnership Project (3GPP), Mobile Competence Centre; 650, Route Des Lucioles; F-06921, Sophia-Antipolis Cedex; France, vol. RAN WG1, No. Athens, Feb. 12, 2017, XP051209785, Retrieved from the Internet: URL:http://www.3gpp.org/ftp/Meetings_3GPP_SYNC/RAN1/Docs/, pp. 1-2.

\* cited by examiner

UPLINK ACK RESOURCE ALLOCATION IN NEW RADIO

CROSS-REFERENCE TO RELATED APPLICATIONS

The present Application for Patent claims priority to Provisional Application No. 62/470,784 entitled "Uplink ACK Resource Allocation in New Radio" filed Mar. 13, 2017, which is assigned to the assignee, and incorporated herein by reference in its entirety.

BACKGROUND

Aspects of the present disclosure relate generally to wireless communication networks, and more particularly, to allocating ACK/NACK resources in wireless communications.

Wireless communication networks are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as new radio (NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in NR communications technology and beyond may be desired.

For example, in a new radio (NR), multiple downlink (DL)/uplink (UL) sub-bands may be configured for allocating acknowledgement(ACK)/negative acknowledgement (NACK) resources (e.g., ACK/NACK resources). However, the mapping between DL and UL sub-bands is not limited to one-to-one mapping and there may be cross-slot scheduling as well. Thus, improvements to efficiently allocate ACK resources in wireless communications may be desired.

SUMMARY OF THE INVENTION

The following presents a simplified summary of one or more aspects to provide a basic understanding of such aspects. This summary is not an extensive overview of all contemplated aspects, and is intended to neither identify key or critical elements of all aspects nor delineate any aspects. Its sole purpose is to present concepts of one or more aspects in a simplified form as a prelude to the more detailed description presented later.

In an aspect, the present disclosure includes a method for wireless communications. The example method may receive, from an gNB, a radio resource control (RRC) configuration indicating a UE-specific resource set that is a subset of a gNB resource pool. The method may also receive, from the gNB, a physical downlink control channel (PDCCH) including a corresponding ACK/NACK resource configuration. Further, the example method may determine one or more acknowledgement/non-acknowledgement (ACK/NACK) resources from the UE-specific resource set for an upcoming physical uplink control channel (PUCCH) based, at least in part, on the ACK/NACK resource configuration.

The present disclosure also includes an apparatus having components configured to execute or means for executing the above-described method, and a computer-readable medium storing one or more codes executable by a processor to perform the above-described method.

Further aspects of the present disclosure may include another method for wireless communications. The example method may receive, from a gNB, a radio resource channel (RRC) configuration indicating multiple UE-specific uplink control information (UCI) resource sets that are subsets of a gNB resource pool. The method may also determine a size of a payload for a UCI to be transmitted on a physical uplink control channel (PUCCH). Further, the example method may determine a selected UE-specific UCI resource set from the multiple UE-specific resource sets for transmitting the UCI on the PUCCH based, at least in part, on the size of the payload of the UCI.

In some aspects, the example method may further include receiving, from the gNB, a physical downlink control channel (PDCCH) including a corresponding acknowledgement (ACK)/non-acknowledgement (NACK) resource configuration. The determination of the selected UE-specific UCI resource set may further include determining based, at least in part, on the ACK/NACK resource configuration.

Further aspects of the method may include identifying a payload size range for each of the multiple UE-specific resource sets. The method may include identifying which of the payload size ranges include the size of the payload for the UCI. The payload size range corresponding to the multiple resource sets may be indicated in the RRC configuration. Further, the method may include selecting the selected UE-specific UCI resource set from one the multiple UE-specific resource sets identified as having a corresponding payload size range that includes the size of the payload of the UCI.

In a further aspect, the present disclosure includes a method of wireless communications at a gNB. The gNB may include a transceiver, a memory, and a processor coupled to the transceiver and memory, wherein the processor is configured to perform the method. The method includes transmitting, to a UE, a radio resource control (RRC) configuration indicating a UE-specific resource set that is a subset of a gNB resource pool. The method further includes transmitting, to the UE, a physical downlink control channel (PDCCH) including a corresponding ACK/NACK resource configuration. The method further includes transmitting, to the UE, user data on a physical downlink shared channel (PDSCH). The method further includes receiving, from the UE, an ACK/NACK for the user data transmitted on the PDSCH on at least one ACK/NACK resource determined, by the UE, based at least in part on the ACK/NACK resource configuration.

The present disclosure also includes a gNB apparatus having components (e.g., a processor) configured to execute or means for executing the above-described method, and a computer-readable medium storing one or more codes executable by a processor to perform the above-described method.

In a further aspect, the present disclosure includes a method of wireless communications at a gNB. The gNB may include a transceiver, a memory, and a processor coupled to the transceiver and memory. The method includes transmitting, to a UE, a radio resource channel (RRC) configuration indicating multiple UE-specific uplink control information (UCI) resource sets that are subsets of a gNB resource pool. The method further includes receiving, from the UE, a UCI in a UE-specific UCI resource set selected by the UE based on a payload size of the UCI.

The present disclosure also includes a gNB apparatus having components (e.g., a processor) configured to execute or means for executing the above-described method, and a computer-readable medium storing one or more codes executable by a processor to perform the above-described method.

To the accomplishment of the foregoing and related ends, the one or more aspects comprise the features described and particularly pointed out in the claims. This description and the annexed drawings set forth in detail certain illustrative features of the one or more aspects. These features are indicative, however, of but a few of the ways in which the principles of various aspects may be employed, and this description should include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
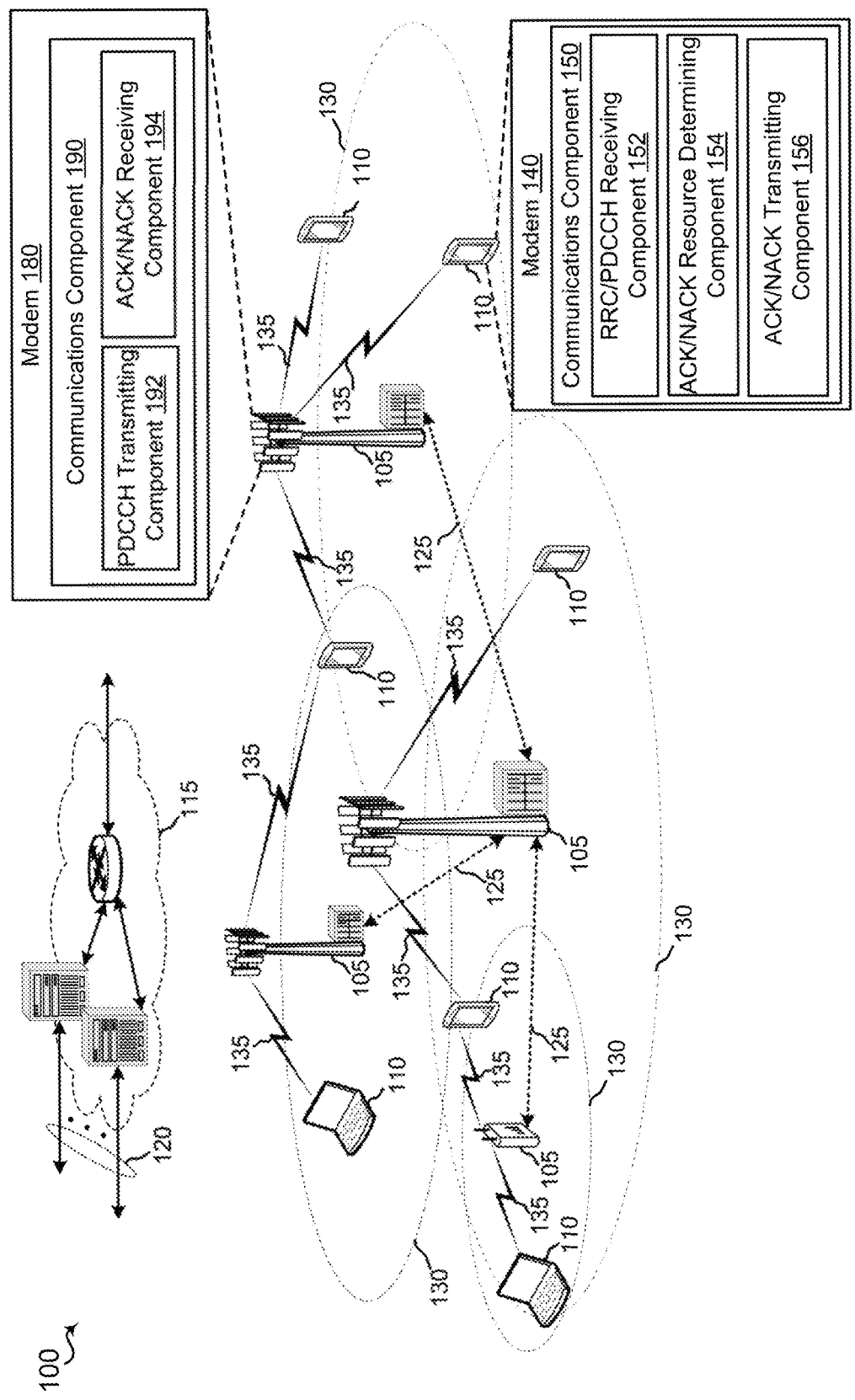
FIG. 1 is a schematic diagram of a wireless communication network including at least one UE having a communications component configured according to this disclosure to determine ACK/NACK resources, and at least one base station having a corresponding communication component configured according to this disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

The present disclosure provides aspects that enable a UE to identify uplink control information (UCI) resources within a UE-specific resource set based on an indication received from a gNB, combined with implicit and/or explicit mapping, and/or based on a payload size of a UCI to be transmitted. In these cases, the UE-specific resource set may be a subset of a gNB resource pool, and may be pooled into multiple different sets of physical resources (e.g., multiple different UE-specific resource sets).

For example, in one implementation of identifying one or more UCI resources within a UE-specific resource set, a UE may receive a radio resource control (RRC) configuration that is transmitted by a gNB and that indicates the UE-specific resource set. Further, the UE may receive a physical downlink control channel (PDCCH) that includes a corresponding acknowledgement (ACK)/non-acknowledgement (NACK) resource configuration. The ACK/NACK resource configuration (e.g., configuration information) may indicate to the UE which UCI resource(s) (e.g., ACK/NACK resource(s)) from the UE-specific resource set are to be used by the UE for transmitting ACK/NACKs on physical uplink control channels (PUCCHs) to the gNB. For instance, in some non-limiting cases, the ACK/NACK resource configuration includes an acknowledgement resource indicator (ARI), and the UE determines which resource(s) from the UE-specific resource set to use based on a value of the ARI. Alternatively or additionally, for instance, in some other non-limiting cases, the UE determines which resource(s) from the UE-specific resource set to use based on an implicit mapping method. In some case, the UE may determine which resource(s) from a location of a control channel element (CCE) carrying the ACK/NACK resource configuration. Alternatively or additionally, for instance, in yet other non-limiting cases, the UE determines which resource(s) from the UE-specific resource set to use based on an explicit mapping with some DCI bits other than ARI bits. For example, some invalid DCI bits may be used to indicate one of the resource in the resource set. Alternatively or additionally, for instance, in yet other non-limiting cases, the UE determines which resource(s) from the UE-specific resource set to use based on at least one of downlink(DL)/uplink (UL) sub-band mapping information, cross-slot scheduling information, or a format of the ACK/NACK resource configuration. Upon determining the UCI or ACK/NACK resource(s) to use from the UE-specific resource set, the UE may transmit ACK/NACKs to the gNB using the determined ACK/NACK resource(s).

Additionally, for example, in another implementation of identifying UCI resources within a UE-specific resource set, the UE may determine a size of a payload for a UCI to be transmitted on a PUCCH. Then, the UE may identify a selected UE-specific UCI resource set from the multiple UE-specific resource sets for transmitting the UCI on the PUCCH based, at least in part, on the size of the payload of the UCI. For example, the UE may determine the selected UE-specific UCI resource set from the multiple UE-specific resource sets based on a mapping of different payload size ranges to respective ones of the multiple UE-specific resource sets.

The present solutions may address one or more issues with pre-New Radio (NR)/5G LTE technologies, which employed implicit mapping techniques for ACK/NACK configuration in a PDCCH. However, such techniques may not be fully suitable for NR/5G operations. For example, an LTE eNB may be a carrier aggregated cell with one primary cell and one or more secondary cells. LTE eNBs may use implicit mapping to allocate (e.g., assign, identify, etc.) ACK/NACK resources for a primary cell and explicit selection with ACK/NACK resource indicator (ARI) to allocate ACK/NACK resources for a secondary cell. Further, for example, an ACK/NACK resource may be a time/frequency resource which may identify a frequency, shift, code division multiplexing (CDM), etc., associated with the specific ACK resource. The LTE techniques do not account for the existence of multiple DL/UL sub-bands in NR/5G, however, leading to collisions across carriers.

In NR, multiple DL/UL sub-bands may be configured and the DL sub-bands and the UL sub-bands may have one-to-one mapping or a many-to-one mapping (more than one DL sub-band mapped to one UL sub-band). If multiple DL sub-bands are mapped to one UL sub-band, the techniques utilized in LTE are not suitable and, as addressed herein, the ACK resources may be assigned/allocated in a way to minimize and/or avoid resource collisions. In other words, the ACK resource is generally not assigned to multiple PUCCHs of different UEs.

The various aspects described in this disclosure provide multiple techniques for mapping ACK/NACK resources within a UE-specific resource set for use by the UE based on configuration information indicated by the PDCCH, using a combination of implicit and explicit rules, and/or based on a payload size of a UCI to be transmitted. By defining mapping schemes for use by the UE and gNB to identify one or more resources within the UE-specific resource set that may be used to transmit an ACK/NACK during a PUCCH, the present disclosure reduces the likelihood of collisions between ACK/NACK transmissions of multiple UEs. The various aspects thus provide a technical improvement in the art of telecommunications and specifically NR, by reducing the likelihood of ACK/NACK collision and the resultant failed receipt of the ACK or NACK.

Additional features of the present aspects are described in more detail below with respect to FIGS. 1-9.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to 5G networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Referring to FIG. 1, in accordance with various aspects of the present disclosure, an example wireless communication network 100 includes at least user equipment (UE) 110 with a modem 140 having a communications component 150 that manages execution of a radio resource control (RRC)/physical downlink control channel (PDCCH) receiving component 152, an ACK/NACK resource determining component 154, and/or an ACK/NACK transmitting component 156. The example wireless communication network 100 may further include an gNB or a base station 105 with a modem 180 having a communications component 190 that manages execution of a PDCCH transmitting component 192 and/or an ACK/NACK receiving component 194 to receive ACK/NACKs from the UE 110.

According to the present disclosure, for example, the gNB 105 may transmit one or more PDCCHs to the UE 110. The PDCCHs may include ACK/NACK resource configuration (e.g., configuration information) which may indicate to the UE 110 the ACK/NACK resources to be used by the UE 110 for transmitting ACK/NACKs on physical uplink control channel (PUCCH) to the gNB 105. For each PDCCH received from the gNB 105, the UE 110 may determine the ACK/NACK resources based at least on a payload and/or a location of the PDCCH. The payload and/or the location of the PDCCH may contain at least one of a DL/UL sub-band mapping information, cross-slot scheduling information, ACK formats, and/or ARIs. Upon determining the ACK/NACK resources, the UE 110 may transmit ACK/NACKs to the gNB 105 using the determined ACK/NACK resources.

The wireless communication network 100 may include one or more base stations 105, one or more UEs 110, and a core network 115. The core network 115 may provide user authentication, access authorization, tracking, interne protocol (IP) connectivity, and other access, routing, or mobility functions. The base stations 105 may interface with the core network 115 through backhaul links 120 (e.g., S1, etc.). The base stations 105 may perform radio configuration and scheduling for communication with the UEs 110, or may operate under the control of a base station controller (not shown). In various examples, the base stations 105 may communicate, either directly or indirectly (e.g., through core network 115), with one another over backhaul links 125 (e.g., X1, etc.), which may be wired or wireless communication links.

The base stations 105 may wirelessly communicate with the UEs 110 via one or more base station antennas. Each of the base stations 105 may provide communication coverage for a respective geographic coverage area 130. In some examples, base stations 105 may be referred to as a base transceiver station, a radio base station, an access point, an access node, a radio transceiver, a NodeB, eNodeB (eNB), gNB, Home NodeB, a Home eNodeB, a relay, or some other suitable terminology. The geographic coverage area 130 for a base station 105 may be divided into sectors or cells making up only a portion of the coverage area (not shown). The wireless communication network 100 may include base stations 105 of different types (e.g., macro base stations or small cell base stations, described below). Additionally, the plurality of base stations 105 may operate according to different ones of a plurality of communication technologies (e.g., 5G (New Radio or "NR"), fourth generation (4G)/LTE, 3G, Wi-Fi, Bluetooth, etc.), and thus there may be overlapping geographic coverage areas 130 for different communication technologies.

In some examples, the wireless communication network 100 may be or include one or any combination of communication technologies, including a NR or 5G technology, a Long Term Evolution (LTE) or LTE-Advanced (LTE-A) or MuLTEfire technology, a Wi-Fi technology, a Bluetooth technology, or any other long or short range wireless communication technology. In LTE/LTE-A/MuLTEfire networks, the term evolved node B (gNB) may be generally used to describe the base stations 105, while the term UE may be generally used to describe the UEs 110. The wireless communication network 100 may be a heterogeneous technology network in which different types of gNBs provide coverage for various geographical regions. For example, each gNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may generally cover a relatively large geographic area (e.g., several kilometers in radius) and may allow unrestricted access by the UEs 110 with service subscriptions with the network provider.

A small cell may include a relative lower transmit-powered base station, as compared with a macro cell, that may operate in the same or different frequency bands (e.g., licensed, unlicensed, etc.) as macro cells. Small cells may include pico cells, femto cells, and micro cells according to various examples. A pico cell, for example, may cover a small geographic area and may allow unrestricted access by the UEs 110 with service subscriptions with the network provider. A femto cell may also cover a small geographic area (e.g., a home) and may provide restricted access and/or unrestricted access by the UEs 110 having an association with the femto cell (e.g., in the restricted access case, the UEs 110 in a closed subscriber group (CSG) of the base station 105, which may include the UEs 110 for users in the home, and the like). An gNB for a macro cell may be referred to as a macro gNB. An gNB for a small cell may be referred to as a small cell gNB, a pico gNB, a femto gNB, or a home gNB. An gNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on the IP. A user plane protocol stack (e.g., packet data convergence protocol (PDCP), radio link control (RLC), MAC, etc.), may perform packet segmentation and reassembly to communicate over logical channels. For example, a MAC layer may perform priority handling and multiplexing of logical channels into transport channels. The MAC layer may also use hybrid automatic repeat/request (HARQ) to provide retransmission at the MAC layer to improve link efficiency. In the control plane, the RRC protocol layer may provide establishment, configuration, and maintenance of an RRC connection between a UE 110 and the base stations 105. The RRC protocol layer may also be used for the core network 115 support of radio bearers for the user plane data. At the physical (PHY) layer, the transport channels may be mapped to physical channels.

The UEs 110 may be dispersed throughout the wireless communication network 100, and each UE 110 may be stationary and/or mobile. A UE 110 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 110 may be a cellular phone, a smart phone, a personal digital assistant (PDA), a wireless modem, a wireless communication device, a handheld device, a tablet computer, a laptop computer, a cordless phone, a smart watch, a wireless local loop (WLL) station, an entertainment device, a vehicular component, a customer premises equipment (CPE), or any device capable of communicating in wireless communication network 100. Additionally, a UE 110 may be Internet of Things (IoT) and/or machine-to-machine (M2M) type of device, e.g., a low power, low data rate (relative to a wireless phone, for example) type of device, that may in some aspects communicate infrequently with wireless communication network 100 or other UEs 110. A UE 110 may be able to communicate with various types of base stations 105 and network equipment including macro gNBs, small cell gNBs, macro gNBs, small cell gNBs, relay base stations, and the like.

A UE 110 may be configured to establish one or more wireless communication links 135 with one or more base stations 105. The wireless communication links 135 shown in wireless communication network 100 may carry uplink (UL) transmissions from a UE 110 to a base station 105, or downlink (DL) transmissions, from a base station 105 to a UE 110. The downlink transmissions may also be called forward link transmissions while the uplink transmissions may also be called reverse link transmissions. Each wireless communication link 135 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. In an aspect, the wireless communication links 135 may transmit bi-directional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2). Moreover, in some aspects, the wireless communication links 135 may represent one or more broadcast channels.

In some aspects of the wireless communication network 100, the base stations 105 or UEs 110 may include multiple antennas for employing antenna diversity schemes to improve communication quality and reliability between base stations 105 and UEs 110. Additionally or alternatively, base stations 105 or UEs 110 may employ multiple input multiple output (MIMO) techniques that may take advantage of multi-path environments to transmit multiple spatial layers carrying the same or different coded data.

The wireless communication network 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 110 may be configured with multiple downlink CCs and one or more uplink CCs for carrier aggregation. Carrier aggregation may be used with both FDD and TDD component carriers. The base stations 105 and UEs 110 may use spectrum up to Y MHz (e.g., Y=5, 10, 15, or 20 MHz) bandwidth per carrier allocated in a carrier aggregation of up to a total of Yx MHz (x=number of component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications network 100 may further include base stations 105 operating according to Wi-Fi technology, e.g., Wi-Fi access points, in communication with UEs 110 operating according to Wi-Fi technology, e.g., Wi-Fi stations (STAs) via communication links in an unlicensed frequency spectrum (e.g., 5 GHz). When communicating in an unlicensed frequency spectrum, the STAs and AP may perform a clear channel assessment (CCA) or a listen before talk (LBT) procedure prior to communicating in order to determine whether the channel is available.

Additionally, one or more of the base stations 105 and/or UEs 110 may operate according to a NR or 5G technology referred to as millimeter wave (mmW or mmwave) technology. For example, mmW technology includes transmissions in mmW frequencies and/or near mmW frequencies. Extremely high frequency (EHF) is part of the radio frequency (RF) in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. For example, the super high frequency (SHF) band extends between 3 GHz and 30 GHz, and may also be referred to as centimeter wave. Communications using the mmW and/or near mmW radio frequency band has extremely high path loss and a short range. As such, the base stations 105 and/or UEs 110 operating according to the mmW technology may utilize beamforming in their transmissions to compensate for the extremely high path loss and short range.

Figure 2A:
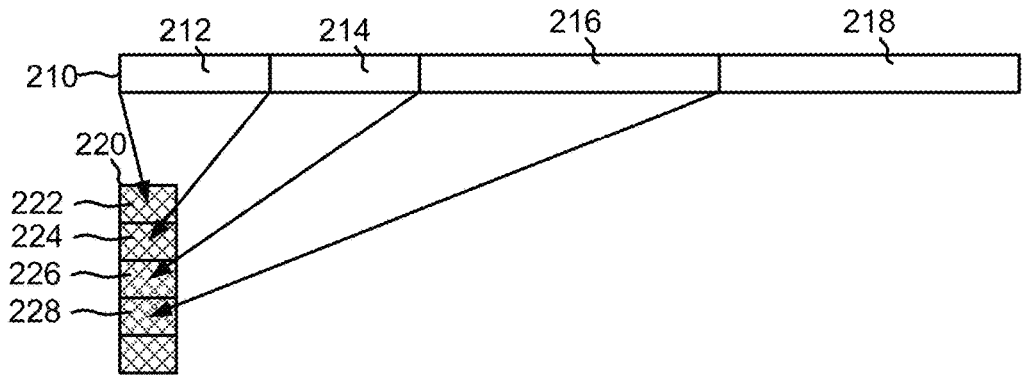
FIGS. 2A and 2B are schematic diagrams of example ACK resource allocations respectively for PUCCH formats 1a and 1b.
Figure 2B:
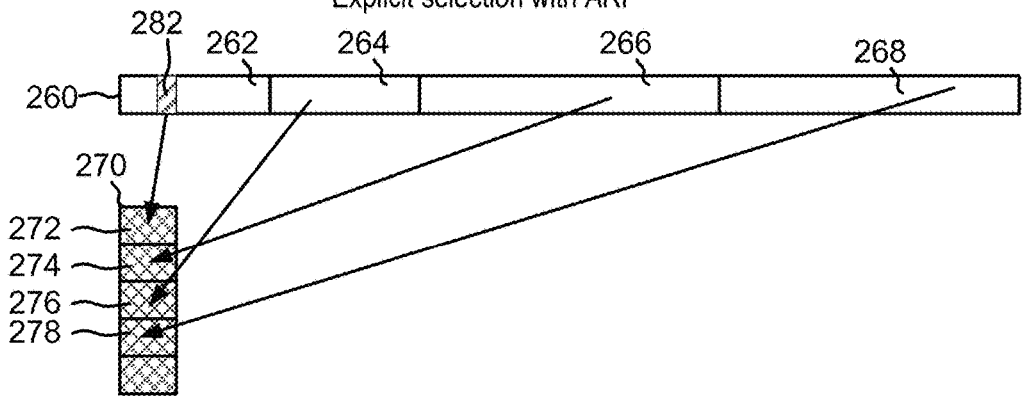

Referring to FIGS. 2A and 2B, an example ACK resource allocation 200 for PUCCH formats 1a includes implicit mapping, and an example LTE ACK resource allocation 201 for PUCCH format 1b includes explicit mapping with ARI. The gNB 105 may be a carrier aggregated cell with one primary cell (PCell) and one or more secondary cells (Scells).

In such a carrier aggregated configuration, the gNB 105 may use PUCCH format 210 with implicit mapping to allocate (e.g., assign, identify, etc.) ACK/NACK resources for a PCell and an explicit selection with ACK/NACK resource indicator (ARI) 260 to allocate ACK/NACK resources for a SCell. For example, an ACK/NACK resource may be a time/frequency resource which may identify a frequency, shift, code division multiplexing (CDM), etc. associated with the specific ACK resource. An ACK/NACK resource may be referred to as an "ACK resource" in the present disclosure, however, the ACK resource may be used to transmit an ACK or a NACK.

The gNB 105 may transmit PDCCHs 212, 214, 216, and/or 218 which may be associated with the PCell; and may transmit PDCCHs 262, 264, 266, and/or 268 which may be associated with the SCell. For the PCell, gNB 105 may assign ACK resources using implicit mapping which may include assigning ACK resources based on indicating a starting downlink control (DL) channel element resource (CCE) of a resource pool, e.g., resource pool 220. For example, PDCCHs 212, 214, 216, and/or 218 may be assigned CCE resources 222, 224, 226, and/or 228, respectively, which may be indicated based on their starting CCE (e.g., a CCE number). The use of the starting CCE to identify ACK resources minimizes overhead in notifying the UE 110 about which ACK resources the UE 110 should use for transmitting an ACK for a specific PDCCH. The implicit mapping may also result in not having to explicitly indicate which ACK resource to use.

For the SCell, for cross-carrier scheduling, gNB 105 may use implicit mapping, as described above in the context of the PCell.

However, for non-cross carrier scheduling, gNB 105 may use PUCCH format 260 with explicit mapping based on ARI for assigning ACK resources to the SCell to avoid collisions (e.g., collisions due to assigning the same ACK resource for two PUCCHs). For example, for the SCell, the gNB 105 may assign ACK resources 272, 276, 274, and/or 278 (from resource pool 270) for PDCCHs 262, 266, 264, and/or 268, respectively. In one aspect, the gNB 105 may also include ARI 282 to be transmitted in PDCCH 262. For example, the ARI 282 may contain two bits which may include four possibilities (e.g., 00, 01, 10, 11) for identifying the ACK resources. An example value of 00 for the ARI 282 may identify the ACK resource 272, an example value of 10 for the ARI 282 may identify the ACK resource 276, and so on. The use of the ARI 282 for explicit selection of ACK resources may minimize collisions in non-cross carrier scheduling configurations.

Figure 3A:
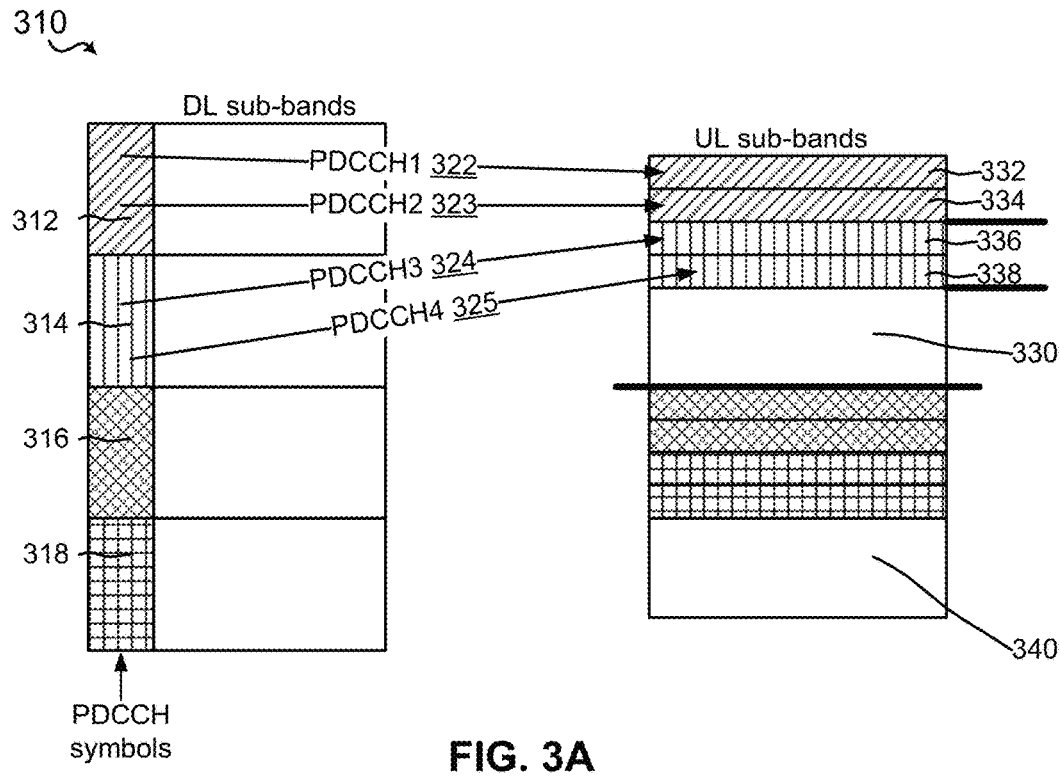
FIG. 3A is a schematic diagram of an example sub-band dependent mapping according to an aspect of the present disclosure.
Figure 3B:
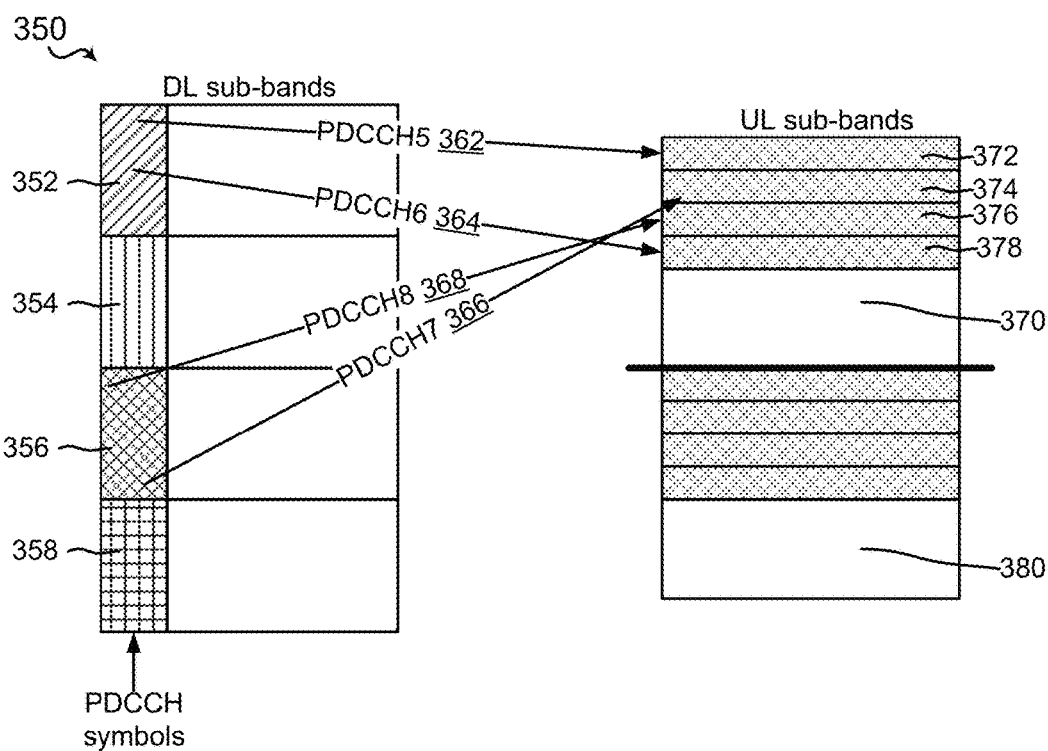
FIG. 3B is a schematic diagram of an additional example sub-band dependent mapping according to an aspect of the present disclosure.

FIGS. 3A and 3B illustrate example sub-band dependent mappings 310 and 350 according to aspects of the present disclosure.

For example, in NR, multiple DL/UL sub-bands may be configured and the DL sub-bands and the UL sub-bands may have one-to-one mapping or a many-to-one mapping (more than one DL sub-band mapped to one UL sub-band). In one implementation, if DL/UL sub-bands are one-to-one mapped, implicit mapping, described above in reference to FIG. 2, may be used. However, if more than one DL sub-bands are mapped to one UL sub-band, the ACK resources are to be assigned/allocated in a way to minimize/avoid resource collisions. In other words, the ACK resource is generally not assigned to multiple PUCCHs of different UEs.

In an aspect, more than one DL sub-bands may be mapped to one UL sub-band. In such a scenario, the sub-band dependent mapping may be performed in multiple ways. For example, all CCEs in DL sub-bands and all ACK resources in UL sub-bands may be numbered together and sub-band offsets may be sent via radio resource control (RRC) configuration or system information blocks (SIBS). The implicit mapping, described above in reference to FIG. 2, may be used. In one more such implementation, CCEs in the DL sub-bands and the ACK resources in the UL sub-bands are numbered independently. In such a scenario where the CCEs and the ACK resources are numbered independently, one DL sub-band may be mapped to one UL sub-band, and each DL sub-band has an ACK resource offset. The ACK resources may be selected based on the starting CCE and the sub-band offset. The sub-band offset may be broadcasted to the UEs via system information blocks (SIBS). In another aspect, resource pools may be broadcasted via SIBS or via RRC configurations, and ARIs in the PDCCH may indicate the specific ACK resources to use.

As illustrated in FIG. 3A, four DL sub-bands (312, 314, 316, and 318) are shown and each DL sub-band may transmit multiple PDCCHs. For example, in sub-band 312, two PDCCHs, PDCCH1 322 and PDCCH2 323 may be transmitted. On the UE 110 side, two UL sub-bands 330 and 340 are shown and each UL sub-band may have multiple ACK resources. For example, UL sub-band 330 may have ACK resources 332, 334, 336, and/or 338. The lines from a DL sub-band to the UL sub-bands show the mapping of multiple PDCCHs (or PDCCH channels) per DL sub-band to multiple ACK resources in the UL sub-band. For example, PDCCH1 322 and PDCCH2 323 of DL sub-band 312 may be mapped to ACK resources 332 and 334 of UL sub-band 330 and PDCCH3 324 and PDCCH4 325 of DL sub-band 314 may be mapped to ACK resources 342 and 344 of UL sub-band 330.

Additionally, as illustrated in FIG. 3B, four DL sub-bands (352, 354, 356, and 358) are shown and each DL sub-band may transmit multiple PDCCHs. For example, in sub-band 352, two PDCCHs, PDCCH5 362 and PDCCH6 364 may be transmitted. On the UE 110 side, two UL sub-bands 370 and 380 are shown and each UL sub-band may have multiple ACK resources. For example, UL sub-band 370 may have ACK resources 372, 374, 376, and/or 378. The lines from a DL sub-band to the UL sub-bands show the mapping of multiple PDCCHs (or PDCCH channels) per DL sub-band to multiple ACK resources in the UL sub-band. However, the mapping is based on ARI inside PDCCH payload and the mapping may be randomized. For example, PDCCH5 362 and PDCCH6 364 of DL sub-band 352 may be mapped to ACK resources 372 and 378 of UL sub-band 370 and PDCCH7 366 and PDCCH8 368 of DL sub-band 356 may be mapped to ACK resources 374 and 376 of UL sub-band 330.

In an implementation, for example, a value of an ARI received in a PDCCH may be used jointly with implicit mapping for resource allocation within a UE-specific resource set for PUCCH transmissions. In an example, each UE-specific resource set may include a number of PUCCH resources. For example, the number of PUCCH resources in the resource set may be from 8 to up to 32. In some cases, the PUCCH resources may be physical resources in one or more UL sub-bands mapped from more than one DL sub-band, and thus the present aspects operate to avoid collisions. For instance, the UE 110 may receive the configuration information from the gNB that identifies the UE-specific resource set (e.g., from 8 to 32 resources). Then, the UE 110 may receive the ARI in the PDCCH. In an example where the ARI has a P-bit value (for example, P may equal 3 or 4), the UE 110 may implicitly map a value of the P-bit ARI to a subset of the UE-specific resources (e.g., a subset of the 4 to 8 PUCCH resources in one or more UL sub-bands) that are to be used to transmit UCI, such as an ACK/NACK. In other words, the UE 110 can map different values of the ARI bits to different subsets of the UE-specific resource set, and, further, the UE 110 may use implicit mapping to select specific resources within the subset identified by the ARI. Thus, the UE-specific resource set is semi-statically configured and ARI bits are used by the UE 110 to perform dynamic resource selection of a subset of the UE-specific resources.

In an aspect, if the number of ARI bits is P_ARI, and the UE 110 requires more than $2^{\wedge}b\_ARI$ resources for the UCI transmission, then the UE 110 may use the above-noted implicit mapping, and may additionally receive an explicit indication of additional UE-specific resources to use. In another example, a 3-bit ARI with up to 8 PUCCH resources per resource set may be implemented. And implicit mapping may be used when the number of resources in the resource set is more than 8.

Figure 4A:
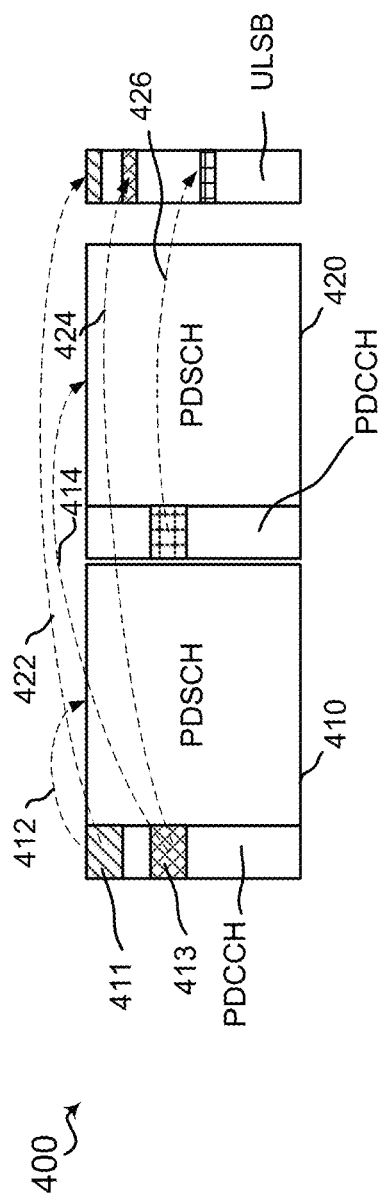
FIG. 4A is a schematic diagram of an example cross-slot scheduling configuration according to an aspect of the present disclosure.
Figure 4B:
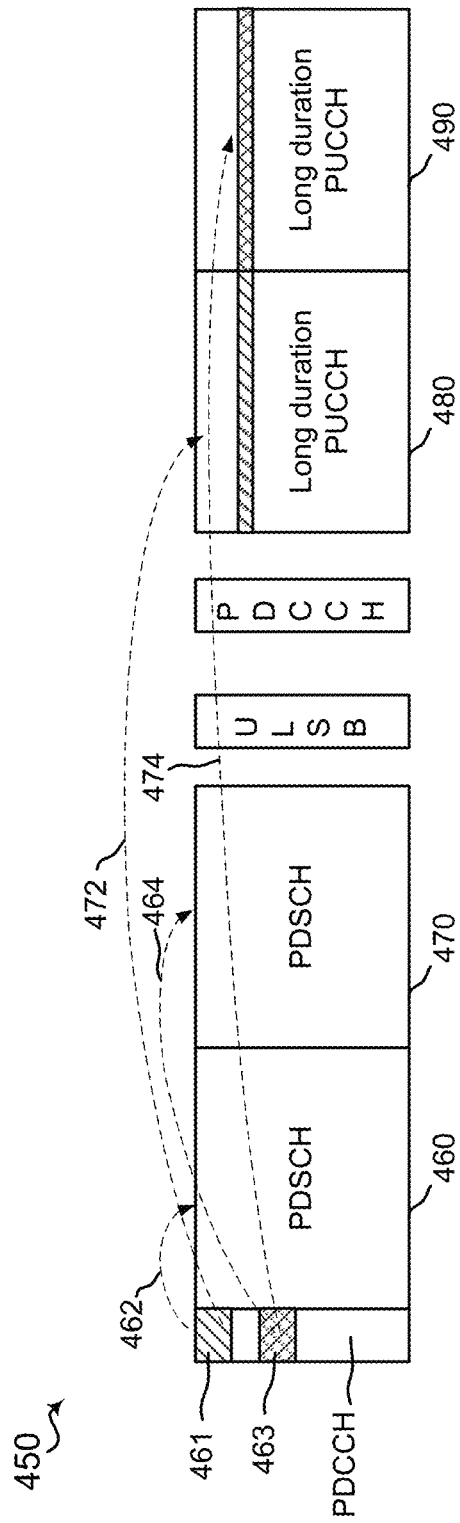
FIG. 4B is a schematic diagram of an additional example cross-slot scheduling configuration according to an aspect of the present disclosure.

FIGS. 4A and 4B illustrate example cross-slot scheduling configurations.

FIG. 4A illustrates an aggregated DL centric slot scheduling configuration 400 with PDCCH scheduling PDSCH transmissions, PDCCHs 411 and 413 scheduling transmission of PDSCHs 410 and 420. In such an aggregated DL configuration, for example, two consecutive DL centric slots 410 and 420, different mapping functions with different offsets may be used for same-slot scheduling and cross-slot scheduling. In an aspect, ACK/NACKs for PDCCHs 422 and 424 are transmitted in an uplink short burst of slot 420 (e.g., cross-slot) and ACK/NACK for PDCCH 426 is transmitted in the uplink short burst of the same slot, slot 420. As illustrated in FIG. 4A, although PDCCH channels corresponding to 424 and 426 are transmitted in the same resource in different slots, they are mapped to different ACK resource in the same ULSB. The mapping can either be done with different slot-dependent offset combined with implicit mapping of PDCCH starting CCEs, or with explicit selection of ARI in PDCCH.

FIG. 4B illustrates an aggregated UL centric slot scheduling configuration 450 with PDCCH scheduling PDSCH transmissions, PDCCHs 461 and 463 scheduling transmission of PDSCHs 460 and 470. In such a configuration, for example, with two consecutive aggregated DL centric slots 460 and 470 and two consecutive aggregated UL centric slots 480 and 490, multiple PDCCHs, e.g., PDCCHs 464 and 474 may be mapped to a same ACK resource if ACK/NACKs are to be transmitted in long duration of different slots, e.g., during long slots 480 and 490. In one implementation, a slot dependent offset may be added that is subtracted from a CCE offset. For example, ACK resource =starting CCE-CCE offset. The slot dependent offset may be communicated to the UE 110 via SIB or RRC configuration. In another implementation, the ARI may be used to explicitly indicate the ACK resources.

Figure 5:
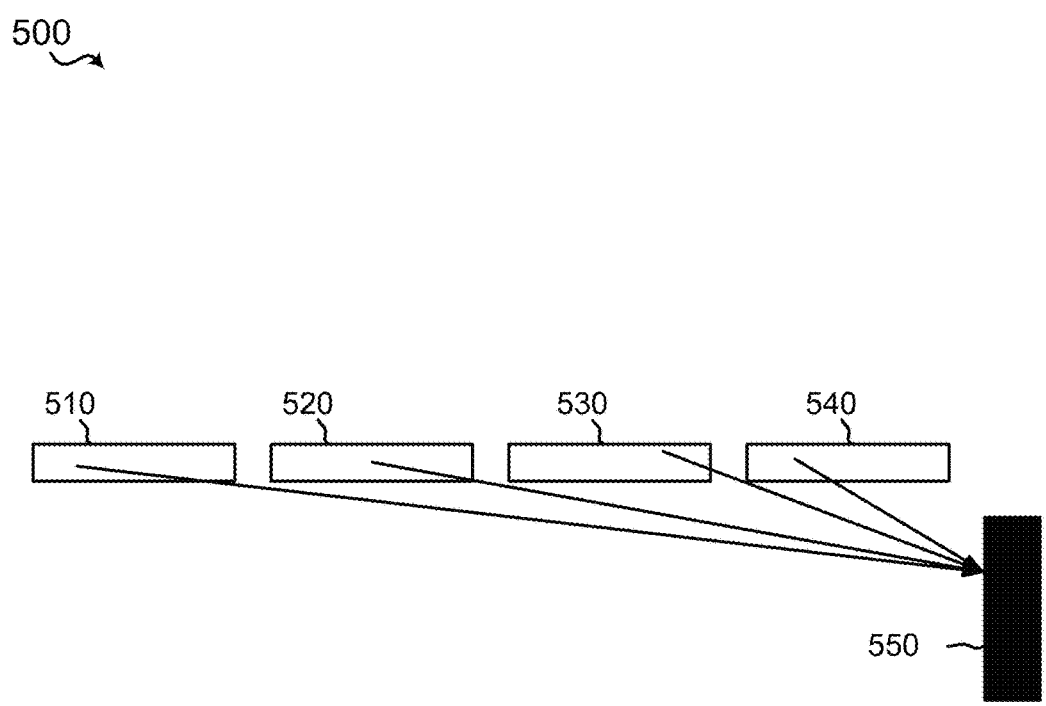
FIG. 5 is a schematic diagram of an example of a variable ACK format 500 according to aspects of the present disclosure.

FIG. 5 illustrates an example of an ACK format 500, which may be varied, according to aspects of the present disclosure.

In an aspect, FIG. 5 illustrates a 4 bit ACK 550 for PDSCHs 510, 520, 530, and/or 540. In the example, the ACK bits for multiple PDSCHs in different slots are transmitted together in the same PUCCH channel, referred to as the HARQ group based multi-bit ACK transmission. In an aspect, a PDSCH may have multiple code blocks (CBs) and one ACK bit may correspond to one CB group (CBG) with one or more CBs per CBG. Multiple ACK bits may be transmitted for different CBGs in one PDSCH. Therefore, the payload size of ACK channel may be different. Multiple ACK formats may be defined for different payload size ranges. The ACK resources for different payload sizes/formats may be different. For example, the ACK resources with a payload of 1 or 2 bits may have one resource pool (e.g., first resource pool), ACK resources with a payload of 2-10 bits may have a different resource pool (e.g., second resource pool), and ACK resources with 10+ bits may have another resource pool (e.g., third resource pool).

In an aspect, different ACK formats may have different resource pools. For example, gNB 110 may indicate different ACK formats, payload sizes, and/or CBG sizes via downlink control information (DCI) or the UE 110 may use certain implicit rules to determine the ACK formats, payload sizes, and/or CBG sizes. The UE 110, upon determining the ACK formats, may use the implicit mapping or use the ARI indication as described above, to select the resource index within the resource pool. In a further aspect, for HARQ group based multi-bit ACKs, implicit mapping may be used based on first or last PDCCH in the group. The HARQ group range may be signaled by setting K1 values in the PDCCH or by configuring a time span in the PDCCH. In one example in FIG. 5, a K1 value configured in PDCCH as 4, 3, 2, 1 may result in 4 ACK bits corresponding to the 4 PDSCH channels to be transmitted together. In an additional implementation, the ACK payload size may be dynamically configured. As a result, the number of RBs may be different and/or the number of RBs may be derived from ACK payload size.

In an aspect, for example, the UE 110 may select one UCI resource set from one or more (up to K=4) configured UCI resource sets based on the UCI payload size, e.g., not including a CRC. A UCI resource set i for UCI payload size may be in the range of $\{N_i, \ldots, N_{i+1}\}$ bits (i=0, ..., K-1). In some cases, the value of N may be set for certain values of i. For instance, for i equal to 0 or 1, $N_0=1$ and $N_1=2$. As such, any remaining values of i may corresponding to UE-specific resource sets. For instance, continuing with the above example, for i=2, ..., K-1, $N_i$ may be configured specifically to the UE 110. In an example, the value of N is in the range of $\{4, 256\}$ with a granularity of 4 bits. $N_K$ may represent a maximum UCI payload size, which may be implicitly or explicitly derived. In some example, $N_K$ may be semi-statically configured in the RRC configuration. Also, in some aspects, for a given UCI payload range, a PUCCH resource set can contain resources for short PUCCH and resources for long PUCCH.

Figure 6:
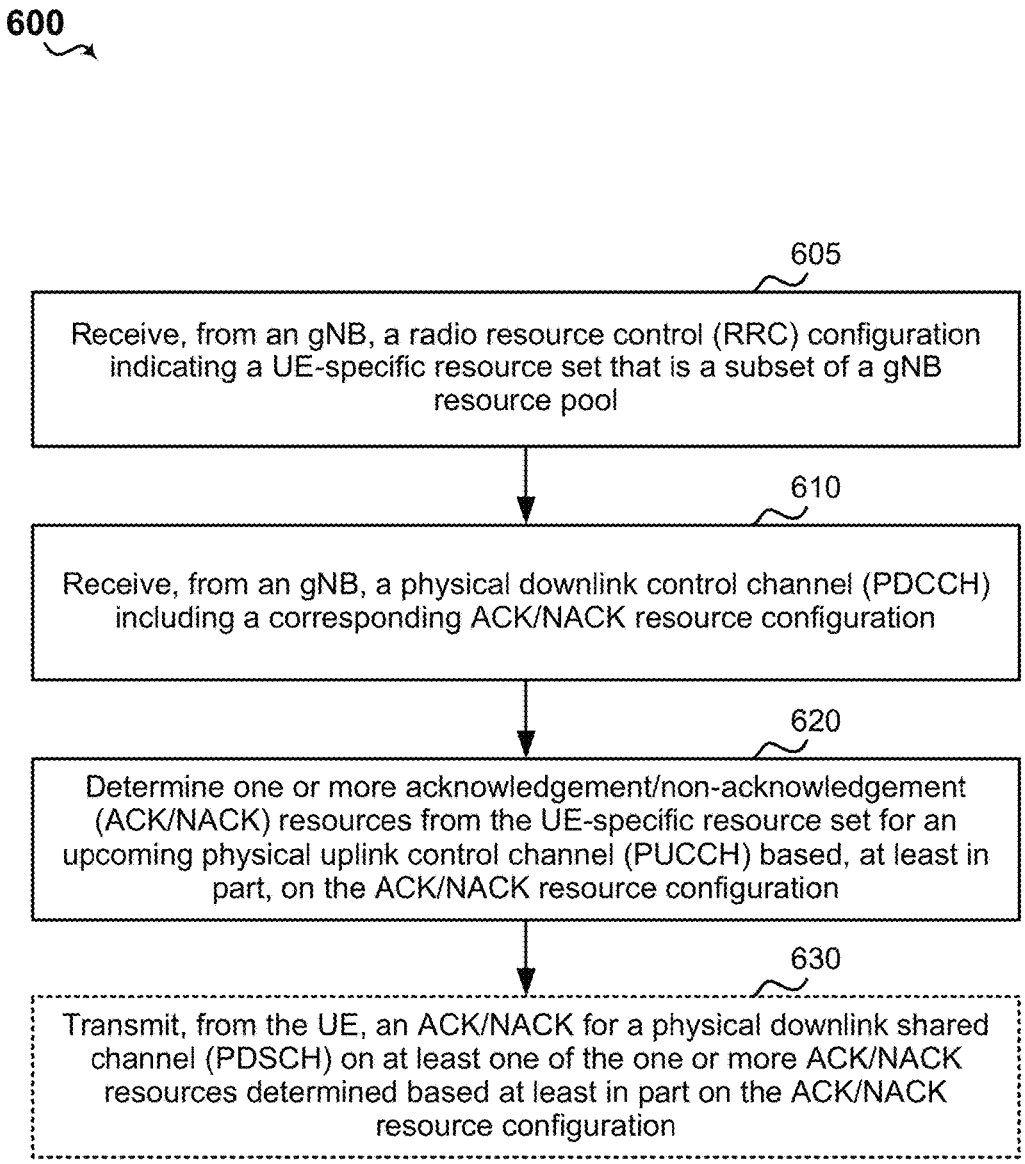
FIG. 6 is a flow diagram of an example method of wireless communication including determining ACK/NACK resources at a user equipment according to an aspect of the present disclosure.

Referring to FIG. 6, for example, a method 600 of wireless communication including determining ACK/NACK resources at UE 110 according to the above-described aspects is disclosed.

For example, at 605, the method 600 includes receiving, from an gNB, a radio resource control (RRC) configuration indicating a UE-specific resource set that is a subset of a gNB resource pool. For instance, in an aspect, the UE 110 and/or modem 140 may execute the communications component 150 and/or RRC/PDCCH receiving component 152 to receive the RRC configuration from the gNB 105. The RRC configuration may contain information directing or otherwise linking the UE to a subset of the gNB resource pool. The subset of the gNB resource pool assigned to the UE may be specific to the UE, thereby avoiding collisions, and the RRC configuration may indicate to the UE which resources of the resources available in the gNB resource pool the UE should use for transmitting ACK/NACKs or other UCI information. As such, the UE-specific resource set may be a semi-statically updated by the RRC configuration.

For example, at 610, the method 600 includes receiving, from an gNB, a physical downlink control channel (PDCCH) including a corresponding ACK/NACK resource configuration. In some cases, the received PDCCH may be one of one or more PDCCHs each including a corresponding ACK/NACK resource configuration. For instance, in an aspect, the UE 110 and/or modem 140 may execute the communications component 150 and/or RRC/PDCCH receiving component 152 to receive one or more PDCCHs from gNB 105 each including a corresponding ACK/NACK resource configuration. As described above, each PDCCH may include an ACK/NACK resource configuration which indicates to the UEs, e.g., UE 110, the ACK/NACK resources from the UE-specific resource set indicated in the RRC configuration, are to be used by the UE 110 for transmitting ACK/NACKs or other UCI in the PUCCH. For instance, in an example, the ACK/NACK resource configuration includes an ARI having a set of bits, where different values of the sets of bits may be used to indicate different subsets of the UE-specific resources to be used.

Further, at 620, the method 600 includes determining, at the UE, one or more ACK/NACK resources from the UE-specific resource set for an upcoming PUCCH based, at least in part, on the ACK/NACK resource configuration. For instance, in an aspect, the UE 110 and/or modem 140 may execute the communications component 150 and/or ACK/NACK resource determining component 154 to determine one or more ACK/NACK resources associated with the PDCCH. The UE 110 and/or ACK/NACK resource determining component 154 may determine the ACK/NACK resources based at least in part on the ACK/NACK configuration.

For example, in an aspect where the ACK/NACK configuration includes the ARI and the UE-specific resource set is semi-statically configured, the UE 110 uses a value of the ARI bits to perform dynamic resource selection of a subset of the UE-specific resources. For instance, the UE 110 can map different values of the ARI bits to different subsets of the UE-specific resource set. Further, as described above, the UE 110 may use implicit mapping to select specific resources within the subset identified by the ARI.

In an aspect, as described above, the ACK/NACK configuration that may implicitly and/or explicitly indicate which resources from the UE-specific resource set are to be used by the UE 110 in transmitting ACK/NACKs.

In an aspect, the UE-specific resource set may include N resources, and the ARI may be b ARI-bits, where different values of the b_ARI bits indicate different subsets of the N resources. If the UE 110 requires more than $2^{b\_ARI}$ resources for the UCI transmission, then the UE 110 may use the above-noted implicit mapping, and may additionally receive an explicit indication of additional UE-specific resources to use. For example, if N=16, b_ARI bits=3, each ARI value will indicate one resource subset of the 16 resources. Each resource subset may contain 2 resources. An implicit mapping method is used to further select one of the two resources in the resource subset. In another example, a 3-bit ARI with up to 8 PUCCH resources per resource set may be implemented. In this example, one ARI value will select one of the up to 8 resources. No implicit mapping is further required.

In some aspects, the implicit mapping method determining the one or more ACK/NACK resources from the UE-specific resource subset is further based on a location of a control channel element (CCE) carrying the ACK/NACK resource configuration. One example is described above with reference to FIG. 2A.

In some aspects the determination of the ACK/NACK resources to be used may be based at least on the DL/UL sub-band mapping function described in reference to FIGS. 3A and 3B, cross-slot scheduling information described in reference to FIGS. 4A and 4B, ACK formats described above in reference to FIG. 5, and/or ARIs.

Optionally, at 630, the method 600 may optionally include transmitting, from the UE, an ACK/NACK for a physical downlink shared channel (PDSCH) on at least one of the one or more ACK/NACK resources determined based at least in part on the ACK/NACK resource configuration. In some instance, that PDSCH may be one of one or more PDSCHs associated with a respective PDCCH of one or more PDCCHs that may be received by the UE 110. For instance, in an aspect, the UE 110 and/or modem 140 may execute the communications component 150 and/or ACK/NACK transmitting component 156 to transmit ACK/NACK for a PDSCH using at least one of the determined ACK/NACK resources.

The ACK/NACK resource configuration information transmitted from the gNB 105 and/or received at the UE 110 may include any combination of one or more of downlink (DL)/uplink sub-band mapping information, cross-slot scheduling information, ACK formats, or ACK/NACK resource indicators (ARIs) which are included in the resource configuration of the corresponding PDCCH.

In some cases, the sub-band mapping information is based on a mapping of a plurality of downlink sub-bands to one or more uplink sub-bands. In an aspect, the sub-band mapping information is based on an overall numbering of downlink control channel element (CCE) resources and uplink ACK resources. In an aspect, the sub-band mapping information is based on an implicit mapping of downlink control channel element (CCE) resources and sub-band dependent offsets.

In an aspect, the cross-slot scheduling information includes different mapping functions for same-slot scheduling and cross-slot scheduling configurations. In an aspect, the cross-slot scheduling information is determined by mapping of PDCCHs to a same resource when the ACK/NACK resource configuration indicates an ACK/NACK is to be transmitted in a long duration of different slots.

In an aspect, the ARI is a multi-level resource index that includes one or more sub-band indexes and one or more resource identifiers that identify at least one resource corresponding to each sub-band identified by the one or more sub-band indexes.

As such, the ARI values included in the PDCCHs may be interpreted differently at the UE 110. For example, in one implementation, the ARI may be a multi-level resource index which may be a two-level resource index that include a combination of sub-band index and resources within a sub-band. In another example, the ARI may be three-level resource index which may include a sub-band index, pay load size (e.g., size of the resource pool), and/or a resource index within the resource pool. In an additional example, the ARI may be a four-level index if the short/long duration indication is included. Further, in another implementation, the ARI may be defined to index a resource within the entire UL band. In other words, the UE 100 may derive the sub-band based on the index. Additionally, if mirror hopping or some other hopping (e.g., offset based hopping) is enabled for the PUCCH, the hopping operation may be derived based on the resource in the sub-band as the hopping operation may be defined on a per sub-band basis. Furthermore, in another implementation, the ARI values may be configured separately for same-slot and cross-slot scheduling configurations. For example, a first set of four possible resources indexed by the ARI may be used for the same-slot scheduling while a second of four possible resources indexed by the ARI may be used for the cross-slot scheduling.

In one implementation, the ACK payload size, resource index, etc. may be dynamically changed. For example, the ACK payload may be dynamically changed to a 1 bit ACK, CBG based multi-bit ACK, or a HARQ group based multi-bit ACK. As a result, the number of RBs may be different based on the size of the payload, as discussed in greater detail with reference to FIG. 7. In an additional example, the resource index may be dynamically changed, which may include short/long burst indication, sub-band index/offset, resource pool index, and/or index within the sub-band/resource pool.

Thus, as described above, communications component 150 determines ACK/NACK resources at the UE 110 from a UE-specific resource set and transmits ACK/NACKs or other UCI to the gNB 110.

Figure 7:
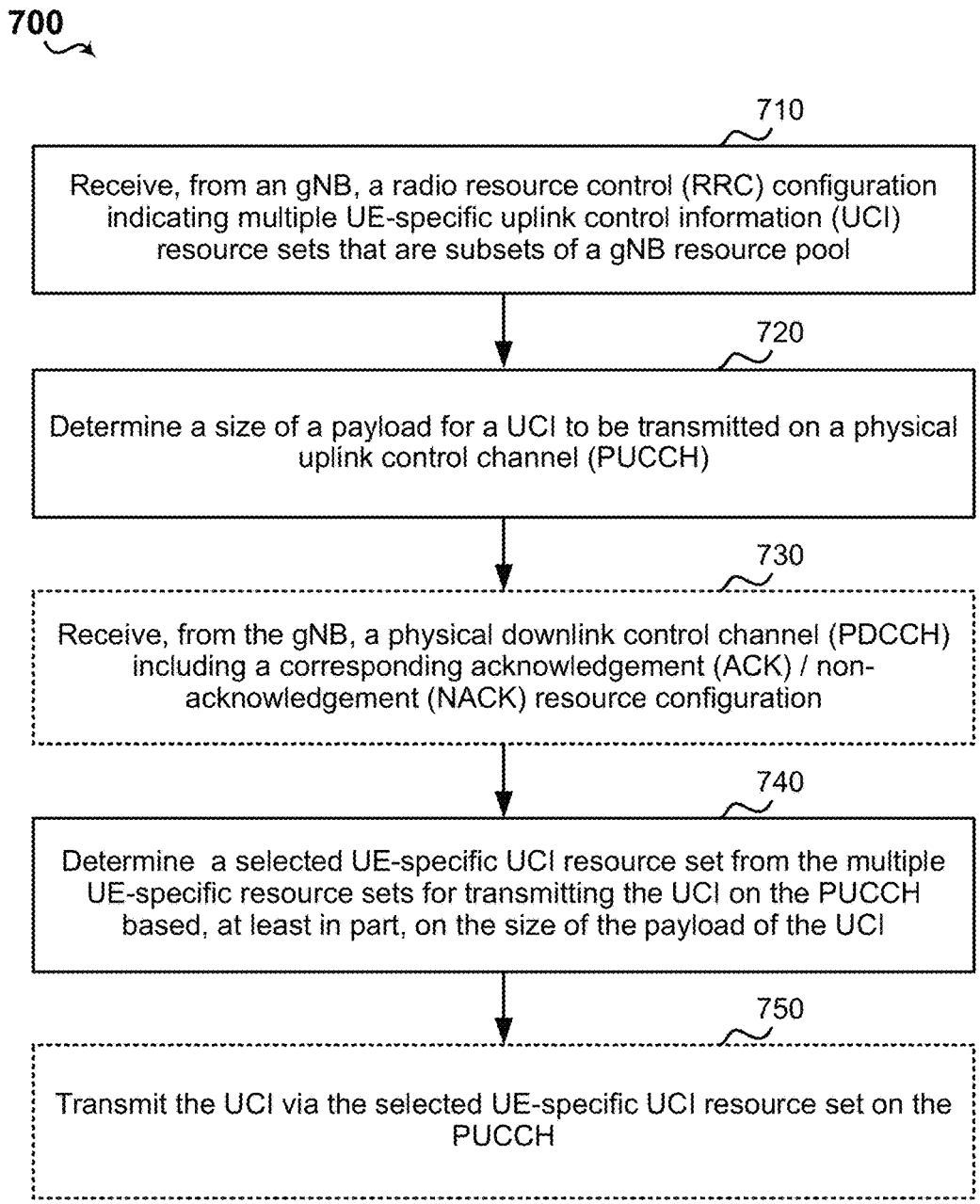
FIG. 7 is a flow diagram of an example method of wireless communication including determining ACK/NACK resources from multiple uplink control information (UCI) resource sets at a user equipment according to an aspect of the present disclosure.

Referring to FIG. 7, for example, a method 700 of wireless communication including determining ACK/NACK resources from multiple uplink control information (UCI) resource sets at UE 110 according to the above-described aspects is disclosed.

For example, at 710, the method 700 includes receiving, from an gNB, a radio resource control (RRC) configuration indicating multiple UE-specific uplink control information (UCI) resource sets that are subsets of a gNB resource pool. For instance, in an aspect, the UE 110 and/or modem 140 may execute the communications component 150 and/or RRC/PDCCH receiving component 152 to receive the RRC configuration from the gNB 105. The RRC configuration may contain information directing or otherwise linking the UE to multiple UCI subsets of the gNB resource pool. The UCI subsets of the gNB resource pool assigned to the UE may be specific to the UE, e.g., to avoid collisions with other UE transmissions, and may indicate payload size ranges appropriate for each of the multiple UE-specific UCI subsets.

Further, at 720, the method 700 includes determining, at the UE, a size of a payload for a UCI to be transmitted on a physical uplink control channel (PUCCH). For instance, in an aspect, the UE 110 and/or modem 140 may execute the communications component 150 and/or ACK/NACK resource determining component 154 to determine the size, or number of bits, of a payload of the UCI the UE 110 intends to transmit with an upcoming PUCCH.

Optionally, at 730, the method 700 may include receiving, from the gNB, a PDCCH including a corresponding ACK/NACK resource configuration. For instance, in an aspect, the UE 110 and/or modem 140 may execute the communications component 150 and/or RRC/PDCCH receiving component 152 to receive one or more PDCCHs from gNB 105. Each PDCCH may include an ACK/NACK resource configuration, which indicates to the UEs, e.g., UE 110, the ACK/NACK resources from the UE-specific UCI resource sets indicated in the RRC configuration, are to be used by the UE 110 for transmitting ACK/NACKs in the PUCCH. For example, in one aspect, the ACK/NACK resource configuration may be an ARI. In some aspects, the ACK/NACK resource configuration includes an acknowledgement resource indicator (ARI), and the UCI comprises an acknowledgement ACK or a NACK.

Further, at 740, the method 700 includes determining, at the UE, a selected UE-specific UCI resource set from the multiple UE-specific resource sets for transmitting the UCI on the PUCCH based, at least in part, on the size of the payload of the UCI. For instance, in an aspect, the UE 110 and/or modem 140 may execute the communications component 150 and/or ACK/NACK resource determining component 154 to determine one or more ACK/NACK resources from one of the multiple UCI resource sets based, at least in part, on the determined payload size. The communications component 150 and/or ACK/NACK resource determining component 154 may identify payload ranges associated with each of the multiple UCI resource sets. For example, but not limited hereto, a first resource set may be used for payloads ranging in size from 1 bits to 2 bits, while a second resource set may be used with payloads ranging in size from 3-12 bits. The communications component 150 and/or ACK/NACK resource determining component 154 may identify which of the payload size ranges overlap with the determined payload size. That is, the UE 110 may determine whether the determined payload size falls within any of the identified payload size ranges. The UE 110 may select one of the multiple UCI resource sets having a payload size range within which the determined payload size is included. In a further example, but not limited hereto, a determined payload size of 8 bits could be transmitted with resources from either of the aforementioned resource sets, but a payload size of 4 bits could only be transmitted with resources from the first resource set.

In some aspects, determining the selected UE-specific UCI resource set may further include selecting one or more resources within the selected UE-specific UCI resource set based on implicit and/or explicit mapping. For example, such aspects may include receiving an acknowledgement resource indicator (ARI), and mapping to the one or more resources within the selected UE-specific UCI resource set based on a value of the ARI. As such, some aspects may include receiving an ARI and selecting one or more resources within the selected UE-specific UCI resource set based on the ARI.

In some aspects, the ARI includes a resource index, and thus determining the selected UE-specific UCI resource set may further include selecting a sub-band associated with the one or more resources based on the resource index. For example, In some aspects, in response to receiving the ARI, determining the selected UE-specific UCI resource set may further include selecting, based on the ARI, a first group of one or more resources within the selected UE-specific UCI resource set for same-slot scheduling or a second group of one or more resources within the selected UE-specific UCI resource set for cross-slot scheduling. In some aspects, determining the one or more ACK/NACK resources from the UE-specific resource set is based, at least in part, on cross-slot scheduling information and PDCCHs of different slots have ARIs of equal value.

Optionally, at 750, the method 700 may include transmitting the UCI via the selected UE-specific UCI resource set on the PUCCH. For instance, in an aspect, the UE 110 and/or modem 140 may execute the communications component 150 and/or ACK/NACK transmitting component 156 to transmit the UCI, e.g., an ACK/NACK for a PDSCH, using the selected UE-specific UCI resource set on the PUCCH.

In aspects implementing optional block 730, the specific ACK/NACK resources to be used within each of the multiple UCI resource sets may be determined based, at least in part, on the ACK/NACK configuration received within the PDCCH. The UE 110 and/or ACK/NACK resource determining component 154 may determine the ACK/NACK resources based at least in part on the ACK/NACK configuration. The ACK/NACK configuration may include an acknowledgement resource indicator (ARI) specifically indicating which exact resources from a selected UCI resource set (e.g., a selected subset of the multiple sets of resources within the UE-specific resource set) are to be used by the UE 110 in transmitting ACK/NACKs. Thus, once the UE 110 has selected one of the multiple UCI resource sets based on the payload size, the UE 110 may then use the ACK/NACK configuration to select specific ACK/NACK resources of the UCI resource set for use in transmitting the ACK/NACK within the PUCCH.

In a further additional example, payload size may be different when combined with other UCI. For example, when combined with a channel quality indicator (CQI), payload size may be different as the CQI may have different beam related information. Additionally, the ACK payload size may be different. For instance, if a UE is supposed to transmit 10 bits of ACK, but after combining with the CQI, the UE may be able to transmit only 3 ACK bits. In such scenarios, ACK bundling may be used to merge the ACK bit, or a sub-set of bits may be transmitted and the remaining ACK bits may be transmitted later. Further, the starting resource block and the number of RBs and PUCCH formats (payload size dependent) may be explicitly configured.

Figure 8:
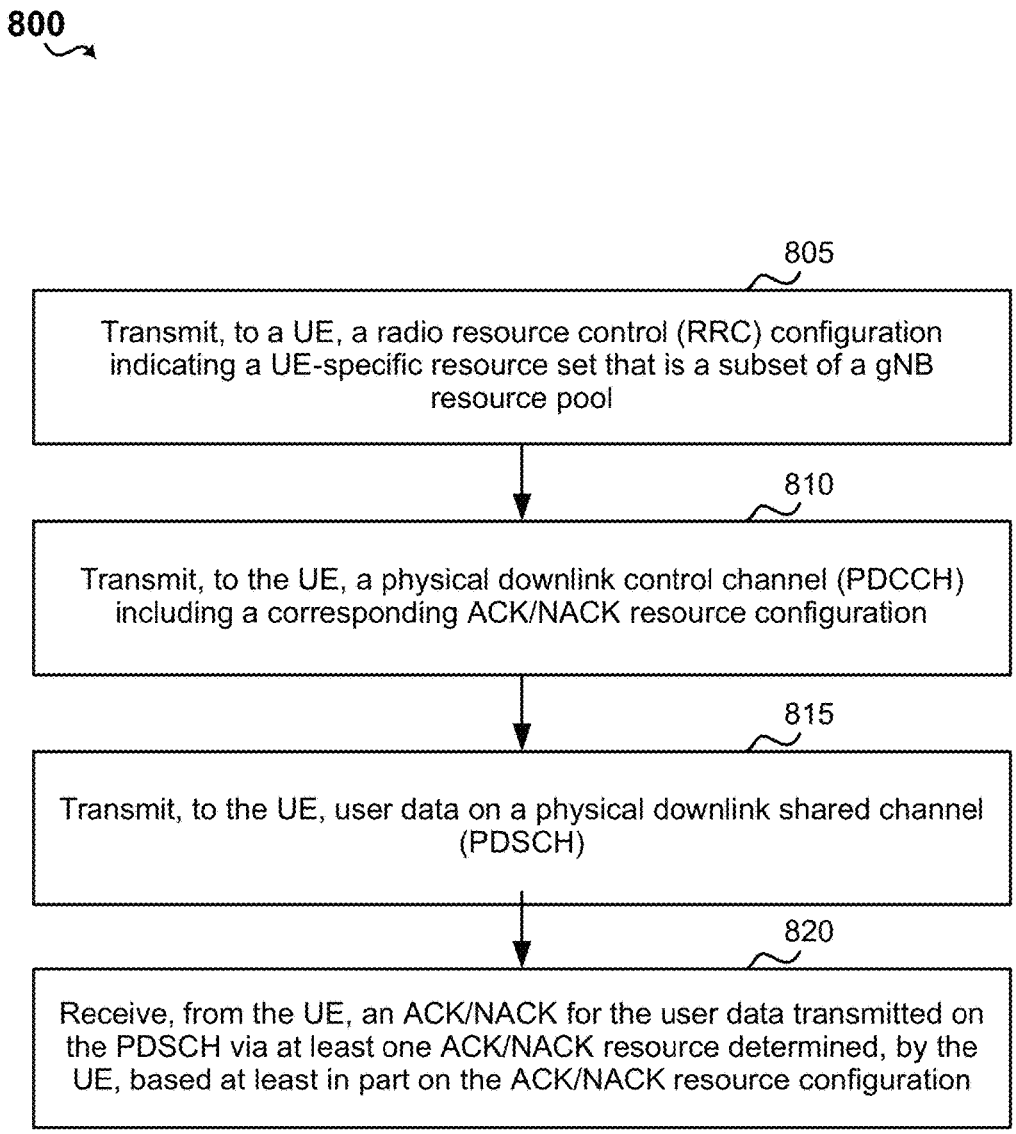
FIG. 8 is a flow diagram of an example method of wireless communication including determining ACK/NACK resources at a gNB according to an aspect of the present disclosure.

Referring to FIG. 8, for example, a method 800 of wireless communication including determining ACK/NACK resources at gNB 105 according to the above-described aspects is disclosed.

For example, at 805, the method 800 includes transmitting, to a UE, a radio resource control (RRC) configuration indicating a UE-specific resource set that is a subset of a gNB resource pool. For instance, in an aspect, the gNB 105 and/or modem 180 may execute the communications component 190 to transmit the RRC configuration to UE 110. The RRC configuration may contain information directing or otherwise linking the UE to a subset of the gNB resource pool. The subset of the gNB resource pool assigned to the UE may be specific to the UE. The gNB 105 may select a resource set to assign to the UE using a variety of techniques. For example, in an implementation, the gNB may select a resource set by identifying available resources at random from the gNB resource pool. Alternatively, in an implementation the gNB may select resources from the next available block of resources in the gNB resource pool. In a further implementation, the gNB may select contiguous blocks of resources from the gNB resource pool. The gNB may assign the resources to the UEs such that the probability of any of the UEs being assigned to the same resource is small.

For example, there may be a total 200 PUCCH resources and a total of 100 UEs with each UE having 16 resources in its resource set. The gNB may randomly choose 16 out of 200 PUCCH resources for each UE (with some of the 16 being short PUCCH resource and the rest for long PUCCH) as the resource set to be identified in the in RRC configure. In a particular slot, if the 10 out of 100 UE need to transmit PUCCH, gNB may select one of the 16 resources from these UE's resource set to that the probability of any of the two UEs using the same resource is minimized.

For example, at 810, the method 800 includes transmitting, to the UE, a physical downlink control channel (PDCCH) including a corresponding ACK/NACK resource configuration. In some cases, the transmitted PDCCH may be one of one or more PDCCHs each including a corresponding ACK/NACK resource configuration. For instance, in an aspect, the gNB 105 and/or modem 180 may execute the communications component 190 and/or PDCCH transmitting component 192 to transmit one or more PDCCHs from gNB 105 each including a corresponding ACK/NACK resource configuration. As described above, each PDCCH may include an ACK/NACK resource configuration which indicates to the UEs, e.g., UE 110, the ACK/NACK resources from the UE-specific resource set indicated in the RRC configuration, are to be used by the UE 110 for transmitting ACK/NACKs or other UCI in the PUCCH. The ACK/NACK resource configuration may include an acknowledgement resource indicator (ARI). Further, the ARI may be a multi-level resource index that includes one or more sub-band indexes and one or more resource identifiers that identify at least one resource corresponding to each sub-band identified by the one or more sub-band indexes. Moreover, one or more of the PDCCHs may identify one or more resource elements associated with a physical downlink shared channel (PDSCH) to be used to send user data to the UE 110.

For example, at 815, the method 800 includes transmitting, to the UE, user data on a physical downlink shared channel (PDSCH). For instance, in an aspect, the gNB 105 and/or modem 180 may execute the communications component 190 to transmit user data from gNB 105 to UE 110 on one or more resource elements of the PDSCH as identified in control information, such as the PCCCH.

For example, at 820, the method 800 may include receiving, from the UE, an ACK/NACK for the user data transmitted on the PDSCH on at least one ACK/NACK resource determined by the UE based at least in part on the ACK/NACK resource configuration. For instance, in an aspect, the gNB 105 and/or modem 180 may execute the communications component 190 and/or ACK/NACK receiving component 194 to receive an ACK/NACK from UE 110. The gNB 104 may receive an ACK/NACK for user data on the PDSCH transmitted by the gNB 105 to confirm whether or not the UE 110 has properly received the signal, e.g., the user data.

Figure 9:
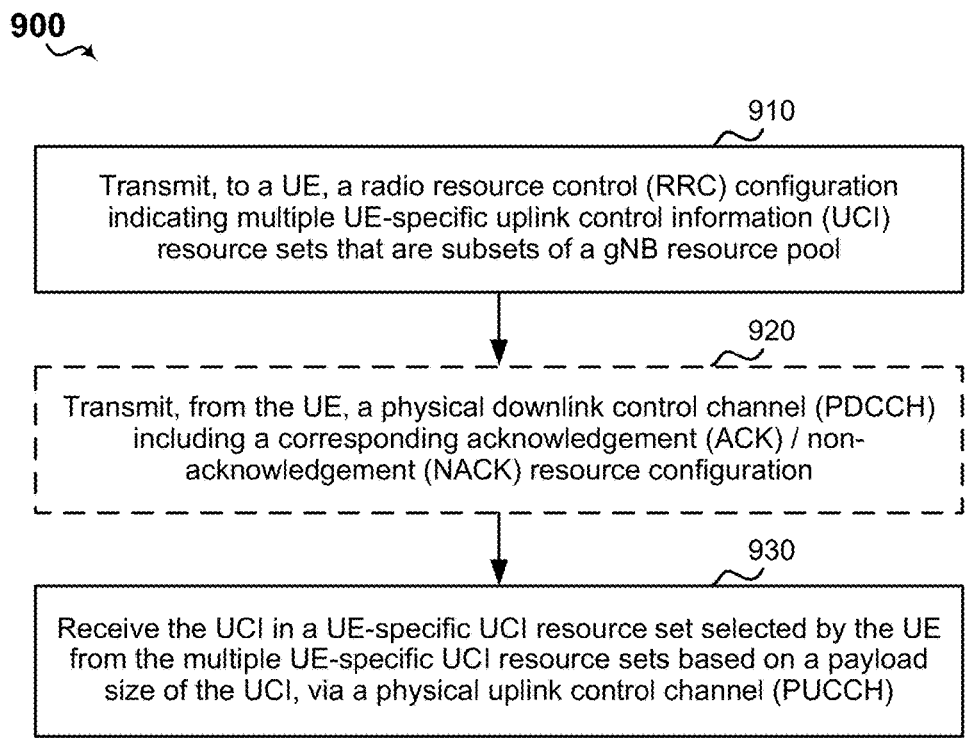
FIG. 9 is a flow diagram of an example method of wireless communication including determining ACK/NACK resources from multiple uplink control information (UCI) resource sets at a gNB according to an aspect of the present disclosure.

Referring to FIG. 9, for example, a method 900 of wireless communication including determining ACK/NACK resources from multiple uplink control information (UCI) resource sets at gNB 105 according to the above-described aspects is disclosed.

For example, at 910, the method 900 includes transmitting, to a UE, a radio resource control (RRC) configuration indicating multiple UE-specific uplink control information (UCI) resource sets that are subsets of a gNB resource pool. For instance, in an aspect, the gNB 105 and/or modem 180 may execute the communications component 180 to transmit the RRC configuration from the gNB 105 to the UE 110. The RRC configuration may contain information directing or otherwise linking the UE to multiple UCI subsets of the gNB resource pool. The UCI subsets of the gNB resource pool assigned to the UE may be specific to the UE, e.g., to avoid collisions with other UE transmissions, and may indicate payload size ranges appropriate for each of the multiple UE-specific UCI subsets. In some implementations the gNB 105 may select the resource sets for assignment to the UE based on random selection, selection of contiguous resource blocks, and/or selection of the next available resource blocks.

Optionally, for example, at 920, the method 900 may include transmitting, to the UE, a PDCCH including a corresponding ACK/NACK resource configuration. For instance, in an aspect, the gNB 105 and/or modem 180 may execute the communications component 190 and/or PDCCH transmitting component 192 to transmit one or more PDCCHs from gNB 105 to UE 110. Each PDCCH may include an ACK/NACK resource configuration, which indicates to the UEs, e.g., UE 110, the ACK/NACK resources from the UE-specific UCI resource sets indicated in the RRC configuration, are to be used by the UE 110 for transmitting ACK/NACKs in the PUCCH. Further, in some aspects, the PDCCH includes one of a plurality of different format types, wherein each of the plurality of format types corresponds to a different subset of the multiple UE-specific resource sets.

For example, at 930, the method 900 may include receiving a UCI in a UE-specific UCI resource set selected by the UE from the multiple UE-specific UCI resource sets based on a payload size of the UCI, on a PUCCH. For instance, in an aspect, the gNB 105 and/or modem 180 may execute the communications component 100 and/or ACK/NACK receiving component 194 to receive the UCI, e.g., an ACK/NACK for a PDSCH, using the selected UE-specific UCI resource set on the PUCCH. In some implementations, the UE-specific resource set may be selected by the UE 110 based on a payload size of the UCI and/or based on the transmitted ACK/NACK resource configuration.

Figure 10:
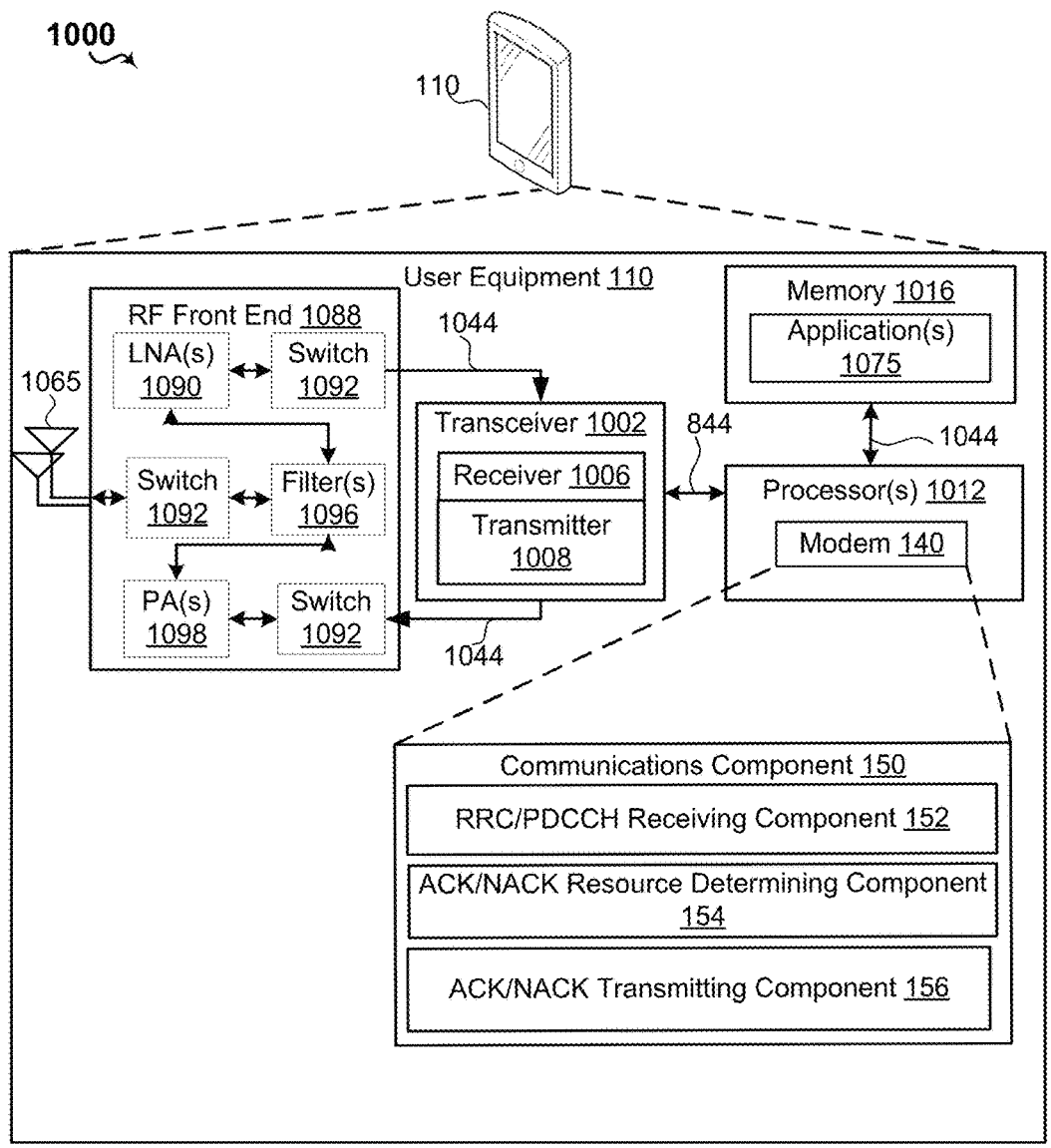
FIG. 10 is a schematic diagram of example components of the UE of FIG. 1.

Referring to FIG. 10, one example of an implementation of a UE 110 may include a variety of components, some of which have already been described above, including components such as one or more processors 1012, memory 1016 and transceiver 1002 in communication via one or more buses 1044, which may operate in conjunction with the modem 140 and communications component 150 to determine ACK/NACK resources at UE 110. Further, the one or more processors 1012, modem 140, memory 1016, transceiver 1002, RF front end 1088 and one or more antennas 1065, may be configured to support voice and/or data calls (simultaneously or non-simultaneously) in one or more radio access technologies.

In an aspect, the one or more processors 1012 can include a modem 140 that uses one or more modem processors. The various functions related to communications component 150 may be included in modem 140 and/or processors 1012 and, in an aspect, can be executed by a single processor, while in other aspects, different ones of the functions may be executed by a combination of two or more different processors. For example, in an aspect, the one or more processors 1012 may include any one or any combination of a modem processor, or a baseband processor, or a digital signal processor, or a transmit processor, or a receiver processor, or a transceiver processor associated with the transceiver 1002. In other aspects, some of the features of the one or more processors 1012 and/or modem 140 associated with the communications component 150 may be performed by the transceiver 1002.

Also, the memory 1016 may be configured to store data used herein and/or local versions of applications 1075 or communications component 150 and/or one or more of its subcomponents being executed by at least one processor 1012. The memory 1016 can include any type of computer-readable medium usable by a computer or at least one processor 1012, such as random access memory (RAM), read only memory (ROM), tapes, magnetic discs, optical discs, volatile memory, non-volatile memory, and any combination thereof. In an aspect, for example, the memory 1016 may be a non-transitory computer-readable storage medium that stores one or more computer-executable codes defining communications component 150 and/or one or more of its subcomponents, and/or data associated therewith, when the UE 110 is operating at least one processor 1012 to execute the communications component 150 and/or one or more of its subcomponents.

The transceiver 1002 may include at least one receiver 1006 and at least one transmitter 1008. The receiver 1006 may include hardware, firmware, and/or software code executable by a processor for receiving data, the code comprising instructions and being stored in a memory (e.g., computer-readable medium). The receiver 1006 may be, for example, a radio frequency (RF) receiver. In an aspect, the receiver 1006 may receive signals transmitted by at least one base station 105. Additionally, the receiver 1006 may process such received signals, and also may obtain measurements of the signals, such as, but not limited to, Ec/Io, SNR, RSRP, RSSI, etc. The transmitter 1008 may include hardware, firmware, and/or software code executable by a processor for transmitting data, the code comprising instructions and being stored in a memory (e.g., computer-readable medium). A suitable example of the transmitter 808 may include, but is not limited to, a RF transmitter.

Moreover, in an aspect, the UE 110 may include a RF front end 1088, which may operate in communication with one or more antennas 1065 and transceiver 802 for receiving and transmitting radio transmissions, for example, wireless communications transmitted by at least one base station 105 or wireless transmissions transmitted by the UE 110. The RF front end 1088 may be communicatively coupled with one or more antennas 1065 and can include one or more low-noise amplifiers (LNAs) 1090, one or more switches 1092, one or more power amplifiers (PAs) 1098, and one or more filters 1096 for transmitting and receiving RF signals.

In an aspect, the LNA 1090 can amplify a received signal at a desired output level. In an aspect, each LNA 1090 may have a specified minimum and maximum gain values. In an aspect, the RF front end 1088 may use one or more switches 1092 to select a particular LNA 1090 and its specified gain value based on a desired gain value for a particular application.

Further, for example, one or more PA(s) 1098 may be used by the RF front end 1088 to amplify a signal for an RF output at a desired output power level. In an aspect, each PA 1098 may have specified minimum and maximum gain values. In an aspect, the RF front end 1088 may use one or more switches 1092 to select a particular PA 1098 and its specified gain value based on a desired gain value for a particular application.

Also, for example, one or more filters 1096 can be used by the RF front end 1088 to filter a received signal to obtain an input RF signal. Similarly, in an aspect, for example, a respective filter 1096 can be used to filter an output from a respective PA 1098 to produce an output signal for transmission. In an aspect, each filter 1096 can be connected to a specific LNA 1090 and/or PA 1098. In an aspect, the RF front end 888 can use one or more switches 1092 to select a transmit or receive path using a specified filter 1096, LNA 1090, and/or PA 1098, based on a configuration as specified by the transceiver 1002 and/or processor 1012.

As such, the transceiver 1002 may be configured to transmit and receive wireless signals through one or more antennas 1065 via RF front end 1088. In an aspect, the transceiver 1002 may be tuned to operate at specified frequencies such that the UE 110 can communicate with, for example, one or more cells associated with one or more base stations 105. In an aspect, for example, the modem 140 can configure the transceiver 1002 to operate at a specified frequency and power level based on the configuration of the UE 110 and communication protocol used by the modem 140.

In an aspect, the modem 140 can be a multiband-multimode modem, which can process digital data and communicate with the transceiver 1002 such that the digital data is sent and received using the transceiver 1002. In an aspect, the modem 140 can be multiband and be configured to support multiple frequency bands for a specific communications protocol. In an aspect, the modem 140 can be multimode and be configured to support multiple operating networks and communications protocols. In an aspect, the modem 140 can control one or more components of the UE 110 (e.g., RF front end 1088, transceiver 1002) to enable transmission and/or reception of signals from the network based on a specified modem configuration. In an aspect, the modem configuration can be based on the mode of the modem and the frequency band in use. In another aspect, the modem configuration can be based on base station information associated with the UE 110 as provided by the network during cell selection and/or cell reselection.

Figure 11:
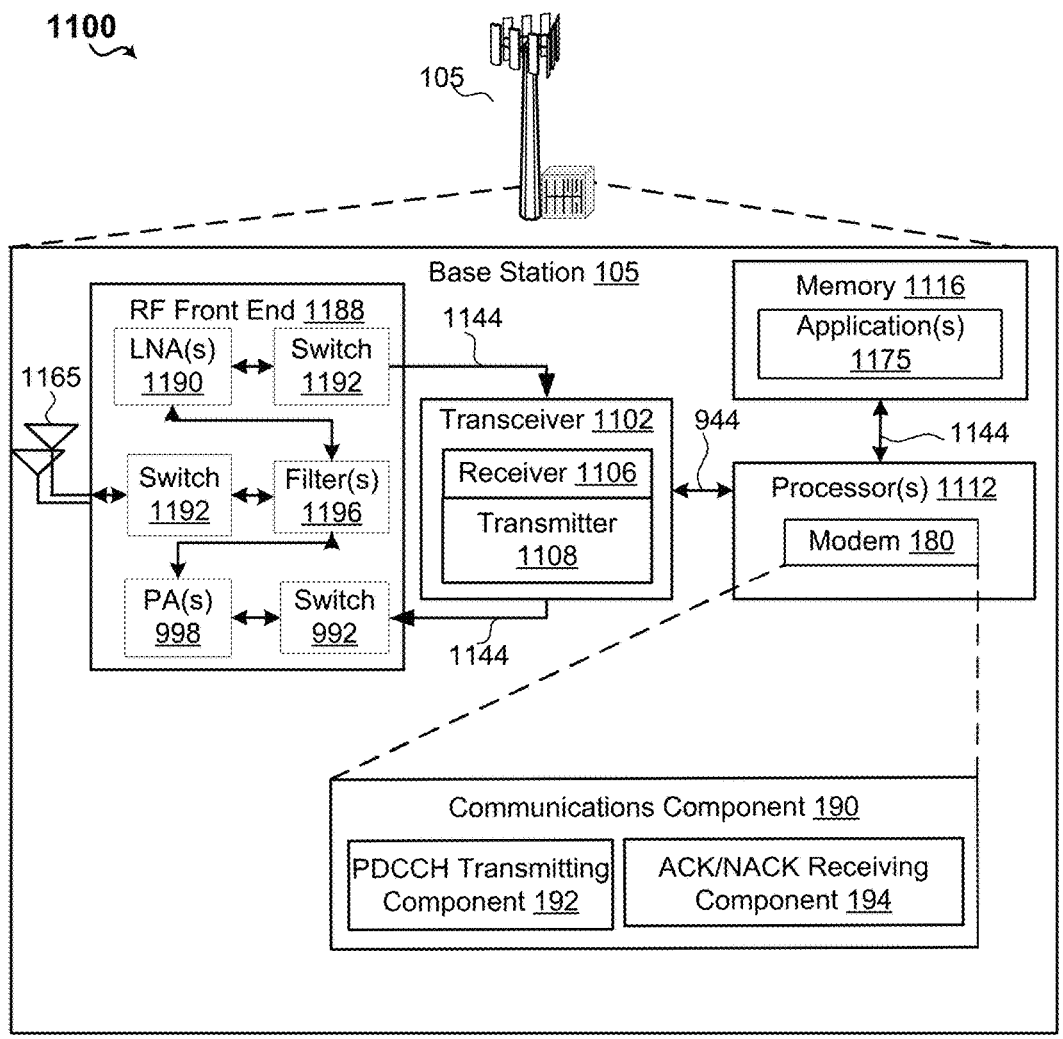
FIG. 11 is a schematic diagram of example components of the base station of FIG. 1.

Referring to FIG. 11, one example of an implementation of base station 105 may include a variety of components, which have already been described above in detail, including components such as one or more processors 1112 and memory 1116 and transceiver 1102 in communication via one or more buses 1144, which may operate in conjunction with modem 180 and communications component 1110 to enable one or more of the functions described herein.

The transceiver 1102, receiver 1106, transmitter 1108, one or more processors 1112, memory 1116, applications 1175, buses 1144, RF front end 1188, LNAs 11110, switches 11112, filters 11116, PAs 11118, and one or more antennas 1165 may be the same as or similar to the corresponding components of UE 110, as described above, but configured or otherwise programmed for base station operations as opposed to UE operations.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method of wireless communications at a user equipment (UE), comprising:
   receiving, from a base station, a radio resource channel (RRC) configuration indicating multiple UE-specific uplink control information (UCI) resource sets, wherein each UE-specific UCI resource set of the multiple UE-specific UCI resource sets is different from each remaining UE-specific UCI resource set of the multiple UE-specific UCI resource sets;
   determining, at the UE, a size of a payload for a UCI to be transmitted on a physical uplink control channel (PUCCH); and
   determining, at the UE, a selected UE-specific UCI resource set from the multiple UE-specific resource sets for transmitting the UCI on the PUCCH based, at least in part, on the size of the payload of the UCI.

2. The method of claim 1, further comprising:
   receiving, from the base station, a physical downlink control channel (PDCCH) including a corresponding acknowledgement (ACK)/non-acknowledgement (NACK) resource configuration,
   wherein determining the selected UE-specific UCI resource set further comprises determining a UE-specific UCI resource of the selected UE-specific UCI resource set based, at least in part, on the ACK/NACK resource configuration.

3. The method of claim 2, wherein the ACK/NACK resource configuration includes a resource indicator (RI), and wherein the UCI comprises at least an ACK or a NACK.

4. The method of claim 3, wherein determining the selected UE-specific resource set is further based, at least in part, on cross-slot scheduling information and a last PDCCH of multiple PDCCHs of different slots.

5. The method of claim 2, wherein receiving the PDCCH includes receiving the PDCCH having one of a plurality of different format types, wherein each of the plurality of different format types corresponds to a different subset of the multiple UE-specific resource sets, and wherein determining the selected UE-specific UCI resource set further comprises selecting from a subset of the multiple UE-specific resource sets corresponding to the one of the plurality of different format types.

6. The method of claim 1, wherein determining the selected UE-specific UCI resource set further comprises:
identifying, at the UE, a payload size range for each of the multiple UE-specific resource sets;
identifying which of the payload size ranges include the size of the payload for the UCI; and
selecting the selected UE-specific UCI resource set from one the multiple UE-specific resource sets identified as having a corresponding payload size range that includes the size of the payload of the UCI.

7. The method of claim 6, further comprising selecting one or more resources within the selected UE-specific UCI resource set based on implicit mapping.

8. The method of claim 6, further comprising selecting one or more resources within the selected UE-specific UCI resource set based on explicit mapping.

9. The method of claim 8, further comprising:
receiving a resource indicator (RI); and
mapping to the one or more resources within the selected UE-specific UCI resource set based on the RI.

10. The method of claim 6, further comprising selecting one or more resources within the selected UE-specific UCI resource set based on a combination of implicit mapping and explicit mapping.

11. The method of claim 1, further comprising:
receiving a resource indicator (RI); and
selecting one or more resources within the selected UE-specific UCI resource set based on the RI.

12. The method of claim 11, wherein the RI includes a resource index, and wherein the method further comprises selecting a sub-band associated with the one or more resources based on the resource index.

13. The method of claim 1, further comprising:
receiving a resource indicator (RI); and
selecting, based on the RI, a first group of one or more resources within the selected UE-specific UCI resource set for same-slot scheduling or a second group of one or more resources within the selected UE-specific UCI resource set for cross-slot scheduling.

14. The method of claim 1, further comprising:
receiving a resource indicator (RI); and
selecting, based on implicit mapping, a first group of one or more resources within the selected UE-specific UCI resource set for same-slot scheduling or a second group of one or more resources within the selected UE-specific UCI resource set for cross-slot scheduling.

15. The method of claim 1, further comprising transmitting the UCI via the selected UE-specific UCI resource set on the PUCCH.

16. A user equipment (UE), comprising:
a transceiver;
a memory;
a processor coupled with the transceiver and the memory and configured to:
receive, from a base station, a radio resource channel (RRC) configuration indicating multiple UE-specific uplink control information (UCI) resource sets, wherein each UE-specific UCI resource set of the multiple UE-specific UCI resource sets is different from each remaining UE-specific UCI resource set of the multiple UE-specific UCI resource sets;
determine a size of a payload for a UCI to be transmitted on a physical uplink control channel (PUCCH); and
determine a selected UE-specific UCI resource set from the multiple UE-specific resource sets for transmitting the UCI on the PUCCH based, at least in part, on the size of the payload of the UCI.

17. The UE of claim 16, wherein the processor is further configured to:
receive, from the base station, a physical downlink control channel (PDCCH) including a corresponding acknowledgement (ACK)/non-acknowledgement (NACK) resource configuration; and
determine a UE-specific UCI resource of the selected UE-specific UCI resource set based, at least in part, on the ACK/NACK resource configuration.

18. The UE of claim 17, wherein the ACK/NACK resource configuration includes a resource indicator (RI), and wherein the UCI comprises an ACK or a NACK.

19. The UE of claim 18, wherein the processor is further configured to determine the selected UE-specific resource set further based, at least in part, on cross-slot scheduling information and a last PDCCH of multiple PDCCHs of different slots.

20. The UE of claim 17, wherein the processor is further configured to:
receive the PDCCH by receiving the PDCCH having one of a plurality of different format types, wherein each of the plurality of different format types corresponds to a different subset of the multiple UE-specific resource sets; and
select from a subset of the multiple UE-specific resource sets corresponding to the one of the plurality of different format types; and
determine the selected UE-specific UCI resource set further based on the subset.

21. The UE of claim 16, wherein the processor is further configured to determine the selected UE-specific UCI resource set by:
identifying a payload size range for each of the multiple UE-specific resource sets;
identifying which of the payload size ranges include the size of the payload for the UCI; and
selecting the selected UE-specific UCI resource set from one the multiple UE-specific resource sets identified as having a corresponding payload size range that includes the size of the payload of the UCI.

22. The UE of claim 21, wherein the processor is further configured to select one or more resources within the selected UE-specific UCI resource set based on implicit mapping.

23. The UE of claim 21, wherein the processor is further configured to select one or more resources within the selected UE-specific UCI resource set based on explicit mapping.

24. The UE of claim 23, wherein the processor is further configured to:
receive a resource indicator (RI); and
map to the one or more resources within the selected UE-specific UCI resource set based on the RI.

25. The UE of claim 21, wherein the processor is further configured to select one or more resources within the selected UE-specific UCI resource set based on a combination of implicit mapping and explicit mapping.

26. The UE of claim 16, wherein the processor is further configured to:
receive a resource indicator (RI); and
select one or more resources within the selected UE-specific UCI resource set based on the RI.

27. The UE of claim 26, wherein the RI includes a resource index, and wherein the processor is further configured to select a sub-band associated with the one or more resources based on the resource index.

28. The UE of claim 16, wherein the processor is further configured to:
receive a resource indicator (RI); and
select, based on the RI, a first group of one or more resources within the selected UE-specific UCI resource set for same-slot scheduling or a second group of one or more resources within the selected UE-specific UCI resource set for cross-slot scheduling.

29. The UE of claim 16, wherein the processor is further configured to:
receive a resource indicator (RI); and
select, based on implicit mapping, a first group of one or more resources within the selected UE-specific UCI resource set for same-slot scheduling or a second group of one or more resources within the selected UE-specific UCI resource set for cross-slot scheduling.

30. The UE of claim 16, further comprising transmitting the UCI via the selected UE-specific UCI resource set on the PUCCH.

31. A user equipment (UE), comprising:
means for receiving, from a base station, a radio resource channel (RRC) configuration indicating multiple UE-specific uplink control information (UCI) resource sets, wherein each UE-specific UCI resource set of the multiple UE-specific UCI resource sets is different from each remaining UE-specific UCI resource set of the multiple UE-specific UCI resource sets;
means for determining a size of a payload for a UCI to be transmitted on a physical uplink control channel (PUCCH); and
means for determining a selected UE-specific UCI resource set from the multiple UE-specific resource sets for transmitting the UCI on the PUCCH based, at least in part, on the size of the payload of the UCI.

32. The UE of claim 31, further comprising:
means for receiving, from the base station, a physical downlink control channel (PDCCH) including a corresponding acknowledgement (ACK)/non-acknowledgement (NACK) resource configuration,
wherein the means for determining the selected UE-specific UCI resource set determines a UE-specific UCI resource of the selected UE-specific UCI resource set based, at least in part, on the ACK/NACK resource configuration.

33. A non-transitory computer readable medium having processor-executable program code stored thereon, comprising:
code for receiving, from a base station, a radio resource channel (RRC) configuration indicating multiple UE-specific uplink control information (UCI) resource sets, wherein each UE-specific UCI resource set of the multiple UE-specific UCI resource sets is different from each remaining UE-specific UCI resource set of the multiple UE-specific UCI resource sets;
code for determining a size of a payload for a UCI to be transmitted on a physical uplink control channel (PUCCH); and
code for determining a selected UE-specific UCI resource set from the multiple UE-specific resource sets for transmitting the UCI on the PUCCH based, at least in part, on the size of the payload of the UCI.

34. The non-transitory computer readable medium of claim 33, further comprising:
code for receiving, from the base station, a physical downlink control channel (PDCCH) including a corresponding acknowledgement (ACK)/non-acknowledgement (NACK) resource configuration; and
code for determining a UE-specific UCI resource of the selected UE-specific UCI resource set based, at least in part, on the ACK/NACK resource configuration.

35. A method of wireless communication at a base station, comprising:
transmitting, to a UE, a radio resource channel (RRC) configuration indicating multiple UE-specific uplink control information (UCI) resource sets, wherein each UE-specific UCI resource set of the multiple UE-specific UCI resource sets is different from each remaining UE-specific UCI resource set of the multiple UE-specific UCI resource sets; and
receiving, from the UE based on the RRC configuration, a UCI in a UE-specific UCI resource set selected by the UE from the multiple UE-specific UCI resource sets based on a payload size of the UCI.

36. The method of claim 35, further comprising:
transmitting, from the base station, a physical downlink control channel (PDCCH) including a corresponding acknowledgement (ACK) / non-acknowledgement (NACK) resource configuration.

37. The method of claim 36, wherein the PDCCH includes one of a plurality of different format types, wherein each of the plurality of different format types corresponds to a different subset of the multiple UE-specific resource sets.

38. A base station, comprising:
a transceiver;
a memory;
a processor coupled with the transceiver and the memory and configured to:
transmit, to a UE, a radio resource channel (RRC) configuration indicating multiple UE-specific uplink control information (UCI) resource sets, wherein each UE-specific UCI resource set of the multiple UE-specific UCI resource sets is different from each remaining UE-specific UCI resource set of the multiple UE-specific UCI resource sets; and
receive, from the UE based on the RRC configuration being transmitted, a UCI in a UE-specific UCI resource set selected by the UE from the multiple UE-specific UCI resource sets based on a payload size of the UCI.

39. The base station of claim 38, wherein the processor is further configured to:
transmit, from the base station, a physical downlink control channel (PDCCH) including a corresponding acknowledgement (ACK)/non-acknowledgement (NACK) resource configuration.

40. The base station of claim 39, wherein the PDCCH includes one of a plurality of different format types, wherein each of the plurality of different format types corresponds to a different subset of the multiple UE-specific resource sets.

41. A non-transitory computer readable medium having processor-executable program code stored thereon, comprising:
code executable to transmit, to a UE, a radio resource channel (RRC) configuration indicating multiple UE-specific uplink control information (UCI) resource sets, wherein each UE-specific UCI resource set of the multiple UE-specific UCI resource sets is different from each remaining UE-specific UCI resource set of the multiple UE-specific UCI resource sets; and code executable to receive, from the UE based on the RRC configuration being transmitted, a UCI in a UE-specific UCI resource set selected by the UE from the multiple UE-specific UCI resource sets based on a payload size of the UCI.

42. A base station, comprising:

means for transmitting, to a UE, a radio resource channel (RRC) configuration indicating multiple UE-specific uplink control information (UCI) resource sets, wherein each UE-specific UCI resource set of the multiple UE-specific UCI resource sets is different from each remaining UE-specific UCI resource set of the multiple UE-specific UCI resource sets; and means for receiving, from the UE based on the RRC configuration being transmitted, a UCI in a UE-specific UCI resource set selected by the UE from the multiple UE-specific UCI resource sets based on a payload size of the UCI.

* * * * *